United States Patent
Tousi et al.

(10) Patent No.: US 12,537,662 B2
(45) Date of Patent: Jan. 27, 2026

(54) PHASE CONTROL IN DISTRIBUTED ARRAYS

(71) Applicant: Regents of the University of Minnesota, Minneapolis, MN (US)

(72) Inventors: Yahya Tousi, Minnetonka, MN (US); Ruixing He, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 295 days.

(21) Appl. No.: 18/446,986

(22) Filed: Aug. 9, 2023

(65) Prior Publication Data
US 2024/0056285 A1 Feb. 15, 2024

Related U.S. Application Data

(60) Provisional application No. 63/371,024, filed on Aug. 10, 2022.

(51) Int. Cl.
*H04L 7/00* (2006.01)
*H04L 7/033* (2006.01)

(52) U.S. Cl.
CPC ............ *H04L 7/0079* (2013.01); *H04L 7/033* (2013.01)

(58) Field of Classification Search
CPC ..... H04L 7/0079; H04L 7/033; H01Q 3/2605; H01Q 3/267; H01Q 3/38; H01Q 21/0025; H01Q 21/0065
See application file for complete search history.

(56) References Cited

U.S. PATENT DOCUMENTS

2019/0372219 A1* 12/2019 Schneider ............. G01S 7/4912

OTHER PUBLICATIONS

He et al., "A 33-37GHz Phase-Aligning Frequency Generator with 3.5? Accuracy and 20ns Switching Time," 2022 17th European Microwave Integrated Circuits Conference (EuMIC), Sep. 26-27, 2022, 4 pp.
He et al., "A mm-Wave Signal Generation and Background Phase Alignment Technique for Scalable Arrays," IEEE Journal of Solid-State Circuits, vol. 58, No. 2, Feb. 2023, pp. 386-399.
He et al., "A Multi-chip Ka-band Phased Array with a Scalable Self-Aligning Architecture," Journal of Latex Class Files, vol. 14, No. 8, Aug. 2015, 4 pp.
He et al., "A Scalable Multi-Chip Self-Aligning Ka-Band Phased Array," ESSCIRC 2023—IEEE 49th European Solid State Circuits Conference (ESSCIRC), Sep. 11, 2023, pp. 461-464.

* cited by examiner

*Primary Examiner* — Jamal Javaid
(74) *Attorney, Agent, or Firm* — Shumaker & Sieffert, P.A.

(57) ABSTRACT

A mm-wave signal generation technique that provides background phase tuning and self-alignment between adjacent sources. This technique is based on direct monitoring of the mm-wave signal and provides phase tuning through a baseband feedback loop. The techniques may be advantageous for phase alignment of large-scale mm-wave phased arrays.

13 Claims, 20 Drawing Sheets

FIG. 12B — limiting amplifier (1 stage)

FIG. 12C — 1st tripler & active filters

FIG. 12D — 2nd frequency tripler

PHASE CONTROL IN DISTRIBUTED ARRAYS

This Application claims the benefit of U.S. Provisional Patent Application 63/371,024, filed 10 Aug. 2022, the entire content of which is incorporated herein by reference.

This invention was made with government support under HR0011-20-1-0006 awarded by the Department of Defense/Defense Advanced Research Projects Agency (DARPA). The government has certain rights in the invention.

TECHNICAL FIELD

The disclosure relates to large-scale phased array radiation, and specifically to phase alignment of radiation elements.

BACKGROUND

Phased arrays combine power over the air by maintaining a coherent phase profile among antenna elements. A scalable solution can consist of an array of identical tiles of radiating elements, each of which carries a smaller sub-array of mm-wave antennae. Each tile carries multiple chips that use frequency synchronization and phase alignment. Individual on-chip phased locked loops (PLLs) sharing the same reference signal can help ensure frequency synchronization across the entire array.

Large mm-wave systems, including phased arrays, implemented using mm-wave and tera-Hertz (THz) integrated circuits may be used in a range of applications for wireless systems, including ultra-broadband 6G communication, high-resolution sensing and imaging, and similar applications. Frequencies in the THz, e.g., 1 trillion hertz ($10^{12}$ Hz) may also be referred to as sub-millimeter range and may be located between the microwave and the infrared range. Operating large-scale arrays may include techniques to maintain phase coherence between the individual radiators spread across an aperture of the array to maintain an effective isotropic radiated power (EIRP), also referred to as equivalent isotropically radiated power. EIRP is a measurement of radiated output power from an ideal isotropic antenna in a single direction.

Because an isotropic antenna is meant to distribute power equally in all directions, an antenna that channels that power into a single direction may calculate the power as EIRP. The EIRP will be the maximum power emitted by the antenna in the direction with highest antenna gain and may be used for comparison with other antennae. Calculating EIRP may take in to account the losses in the transmission line and the loss of power due to the connectors as well as other factors.

SUMMARY

In general, the disclosure describes devices and systems that use techniques to provide a scalable technique for phase alignment of large-scale radiation arrays based on element-by-element phase adjustment. The control scheme may detect phase at the mm-wave frequency and controls at the reference frequency. The techniques of array control of this disclosure are based on distributed tuning. For instance, in some examples, central control may not be needed, but may be possible to use central control in addition to distributed tuning. The mm-wave self-alignment architecture of this disclosure may include two main sections: a high-frequency phase detection and a baseband control loop operation.

In one example, this disclosure describes a circuit configured to transmit wireless electromagnetic radiation comprising a first transmission element and a second transmission element, wherein the first transmission element is configured to receive a first radio-frequency (RF) signal, the second transmission element is configured to receive a second RF signal, and the first RF signal has the same frequency as the second RF signal; phase detector circuitry connected between the first transmission element and the second transmission element, the phase detector circuitry comprising a transmission line connecting the first transmission element to the second transmission element; and a plurality of peak detectors arranged along the transmission line, the plurality of peak detectors configured to measure an interference pattern on the transmission line caused by the first RF signal and the second RF signal; a multiplexor configured to: receive outputs from each peak detector of the plurality of peak detectors; and receive a command to select a first peak detector and a second peak detector; and phase shifter circuitry configured to: receive an output from the multiplexor; adjust a phase difference between the first RF signal and the second RF signal based on a difference between the first peak detector and the second peak detector. In this disclosure a radiating element, or a transmission element may also be referred to as an antenna element. Such an antenna element may receive as well as transmit.

In another example, this disclosure describes a method comprising receiving, by a first transmission element, a first radio frequency (RF) signal; receiving, by a second transmission element, a second RF signal; measuring, by phase detector circuitry connected between the first transmission element and the second transmission element, an interference pattern: wherein the phase detector circuitry comprises: a transmission line, and a plurality of peak detectors arranged along the transmission line, and wherein the interference pattern is on the transmission line, and wherein the plurality of peak detectors is configured to measure the interference pattern on the transmission line generated by the first RF signal and the second RF signal; receiving, by a multiplexor, outputs from each peak detector of the plurality of peak detectors; receiving, by the multiplexor, a command to select a first peak detector and a second peak detector; receiving, by phase shifter circuitry, outputs of the first peak detector and the second peak detector provided by the multiplexor; and adjusting, by the phase shifter circuitry, a phase difference between the first RF signal and the second RF signal based on a difference between the first peak detector and the second peak detector.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 12A-12D are schematic diagrams illustrating the ×9 frequency multiplier chain and building blocks.

DETAILED DESCRIPTION

The techniques of this disclosure that provide phase coherence for large-scale array control may be based on distributed tuning (e.g., central control may not be needed). Such coherent combining may create a large array gain that overcomes propagation loss and limited available power of individual devices. The circuitry of this disclosure may be arranged with an architecture of the scalable phased arrays with phase self-alignment, a high frequency (e.g., mm-wave) interferometer-based phase detector and baseband (reference frequency) control.

Other examples of large-scale radiating arrays may control the arrays by a central source through elaborate tuning of the path delay throughout the array and to each individual radiating element of the array of radiating elements. Such approaches may grow the size of the phased array structure such as with wafer-scale arrays or hybrid chip-board-level integration. However, approaches with central control become extremely costly as the size of the array scales, and often these approaches rely on increasingly expensive hardware capabilities but, more importantly, face fundamental challenges in scaling. Even using expensive hardware, such as capacitor banks of metal-insulator capacitors the limited quality factor of the capacitor and switch elements eventually leads to the degradation in the resonator and limits the frequency of operation. Using frequency multiplication to scale up the output frequency in such systems may still provide little to no control over the phase of the signal. Note that radiating elements may also receive as well as transmit.

Some examples of these other approaches detect phase at the reference frequency and controls phase coherence at the mm-wave frequency. When the phase detector of these other systems operates at the low frequency of the reference signal, any phase error inside the control loop is multiplied by the frequency division factor at the output. Therefore, though the oscillator phasor would be locked to the reference signal but the output has with a significant and unpredictable phase error. A sub-sampling phase-locked loop (PLL) may help this phase error multiplication issue within a single source, but in a multi-source array scenario, even sub-sampling PLL architecture is still blind to random phase variation between adjacent elements.

Figure 1:
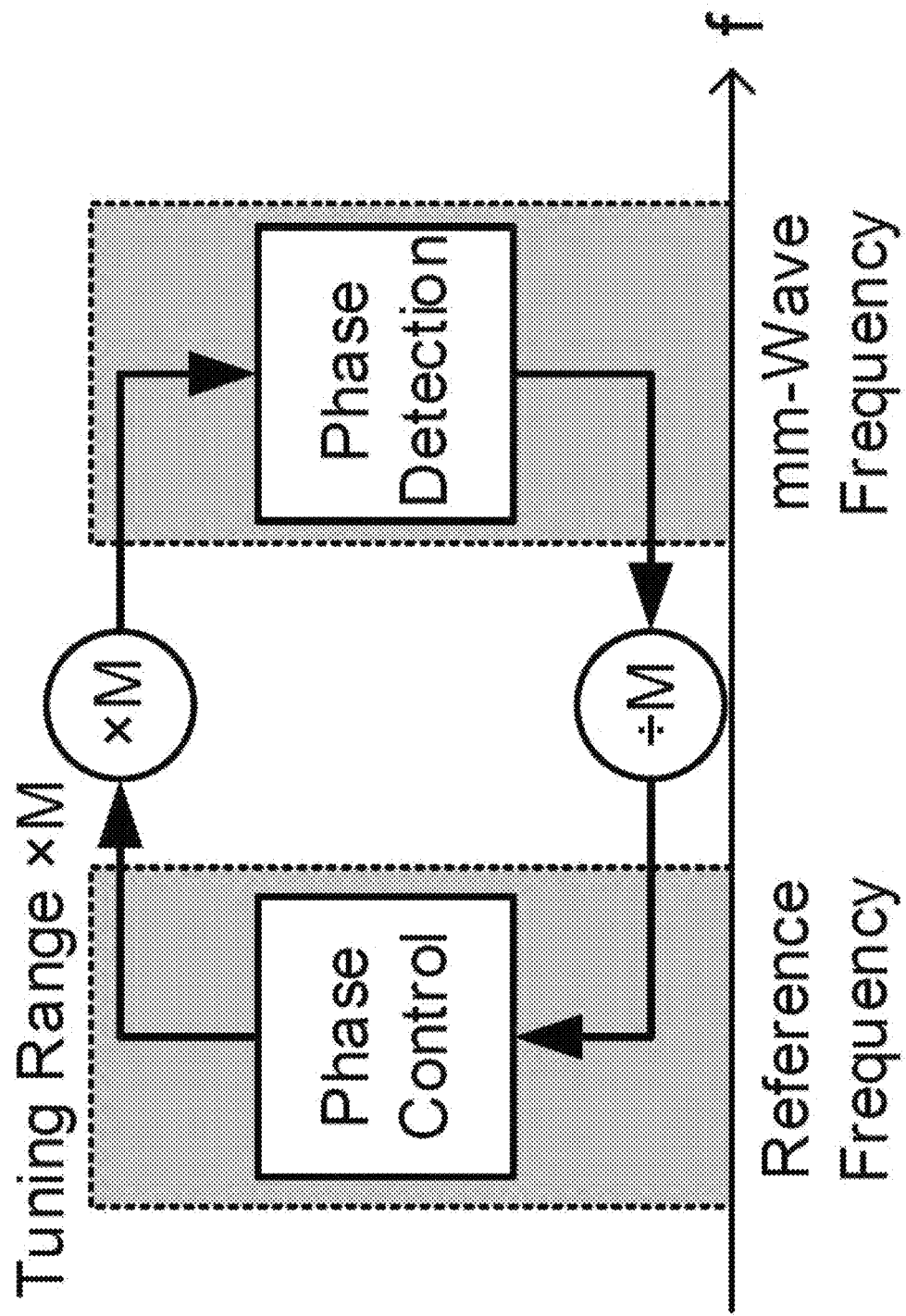
FIG. 1 is a block diagram illustrating the phase detection and phase control architecture according to one or more techniques of this disclosure.

FIG. 1 is a block diagram illustrating the phase detection and phase control architecture according to one or more techniques of this disclosure. The architecture depicted in FIG. 1 includes of two main sections: high-frequency phase detection and the baseband control loop operation. The circuitry implemented with the architecture of FIG. 1 may enable accurate phase sensing at the target frequency while shifting the control loop entirely to the baseband.

The topology shown in FIG. 1 may be fundamentally suitable for signal generation and synchronization at mm-wave and THz frequencies. The circuity may include a mm-wave scalable phase synthesizer. As described above, the circuitry of this disclosure is configured to detect the phase at the target mm-wave frequency while phase control occurs at the lower frequency of the input reference (baseband frequency). In this scheme, the circuitry is configured to detect the output phase at the target mm-wave frequency and control the phase at the frequency of the input reference signal. First, the interferometer-based phase detector is configured to directly measure the phase difference between at least two mm-wave sources without any frequency division. Next, a phase shifter circuit operating at the reference frequency is configured to provide phase alignment between the at least two mm-wave sources based on the measured phase difference.

By effectively switching the location of detection and control the circuitry of this disclosure may simultaneously avoid the challenges described above, including expensive hardware and scaling challenges. First, by controlling phase at the reference frequency, this circuitry may avoid direct control of the resonator resulting in optimal frequency and spectral purity. Second, by directly measuring the phase at the mm-wave band, e.g., using the described interferometer, this circuitry may prevent phase ambiguity and enable accurate phase alignment.

Figure 2A:
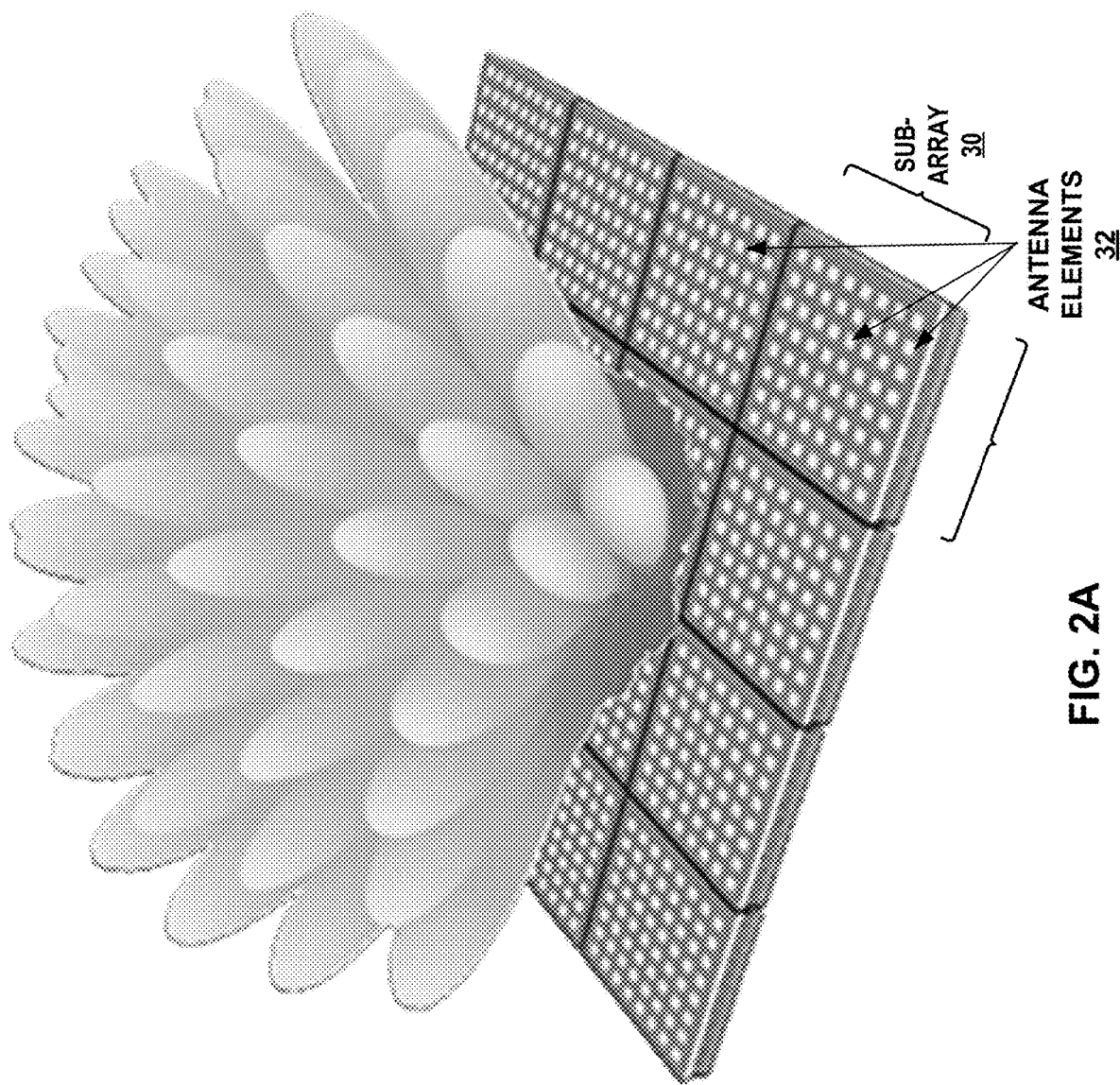
FIGS. 2A, 2B and 2C are conceptual diagrams of a phased array that may output a radiation pattern for communication, object measurement and tracking and other applications.
Figure 2B:
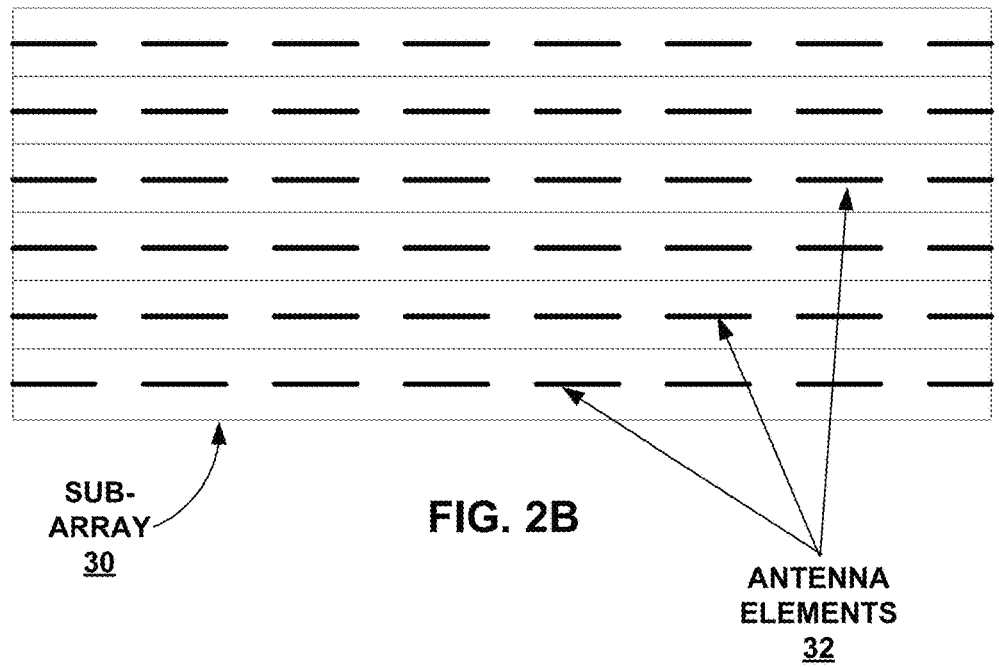
Figure 2C:
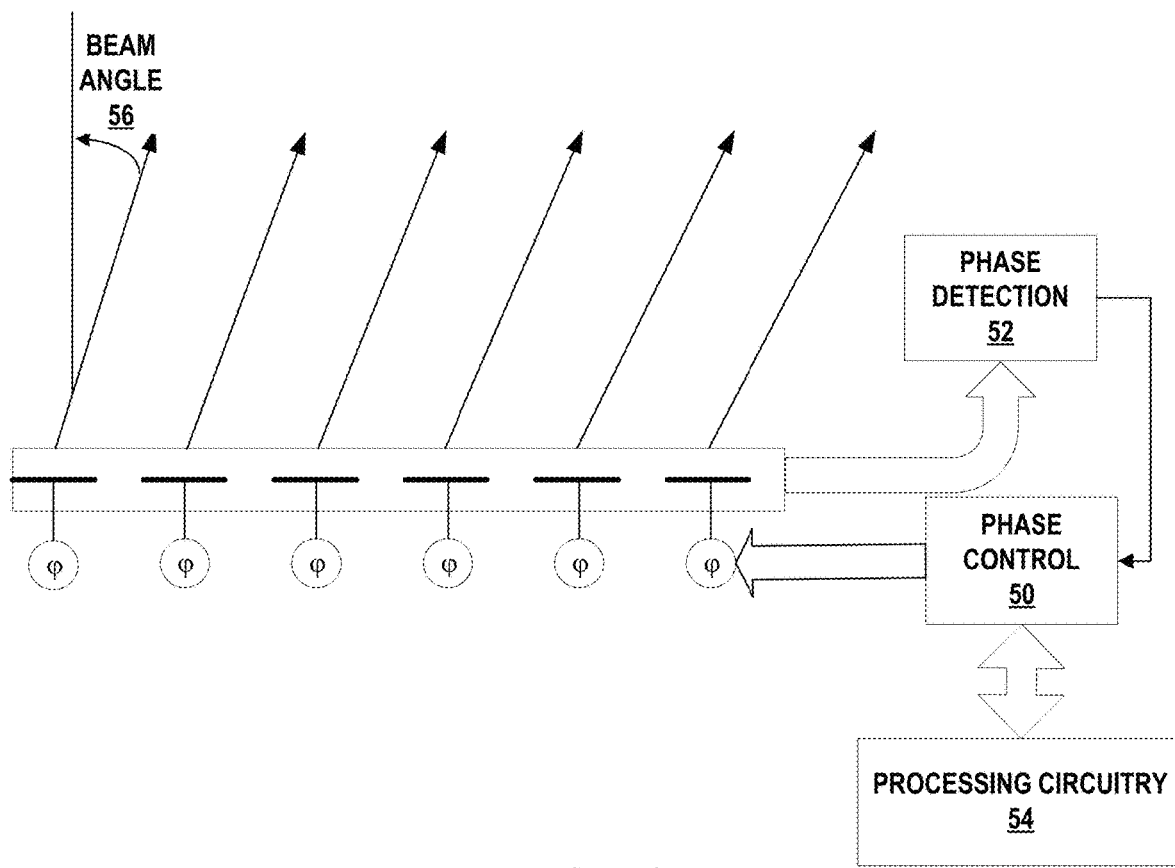

FIGS. 2A, 2B, and 2C are conceptual diagrams of a phased array that may output a radiation pattern for communication, object measurement and tracking and other applications. The example of FIG. 2A illustrates an array of radiating elements configured to transmit, and receive, radiation. FIG. 2B shows a segment of such an array of radiating elements. By controlling the phase, and in some examples, the amplitude, of the output of each element, as shown by phase control circuitry 50 in FIG. 2C, the array may form a transmit beam and control the direction of the transmit beam. As described above in relation to FIG. 1, the circuitry of this disclosure may include phase detection circuitry 52 that provides information to phase control circuitry 50. Processing circuity 54 may control multiplexors to select phase detectors based on the desired beam angle 56.

Figure 3A:
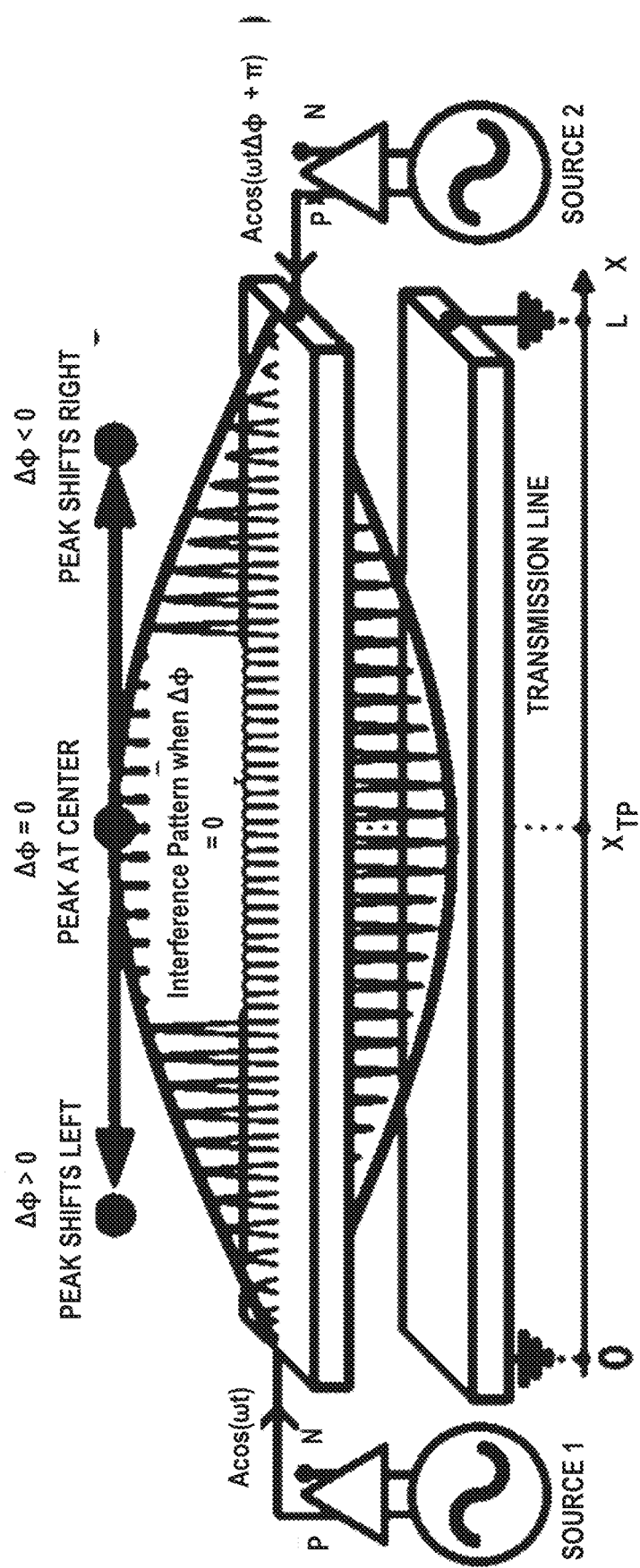
FIGS. 3A and 3B are conceptual diagrams that illustrate examples of interferometers that may be used for phase sensing according to one or more techniques of this disclosure.
Figure 3B:
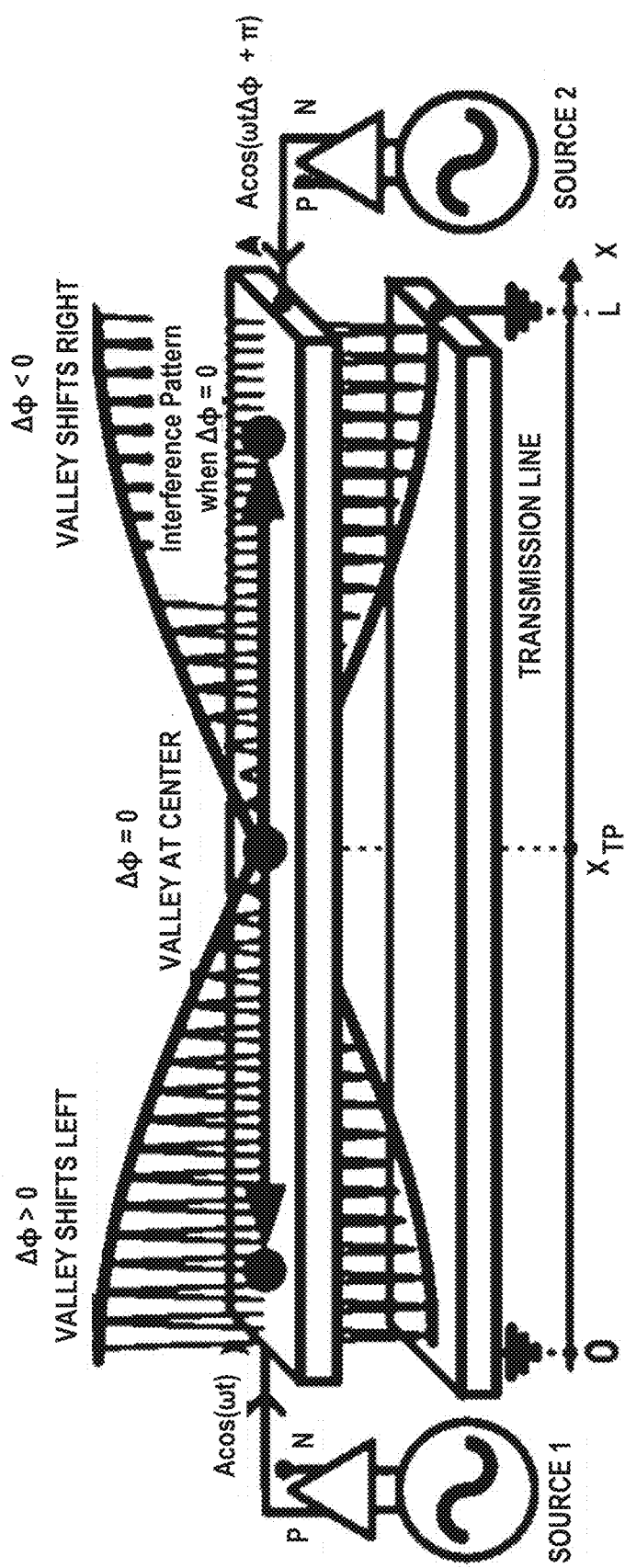

FIGS. 3A and 3B are conceptual diagrams that illustrate examples of interferometers that may be used for phase sensing according to one or more techniques of this disclosure. Interferometers may have a variety of applications in science and engineering fields including in optical physics and electrical signal processing.

FIG. 3A illustrates an interferometer connected with the same polarity. The two mm-wave sources would generate an interference pattern with a peak on the transmission line. FIG. 3B illustrates an interferometer connected with the opposite polarity. The generated interference pattern has a valley, and the position of the peak or valley may shift along the line as a function of a difference in phase (Δϕ) between source 1 and source 2.

Interferometers work by merging multiple electromagnetic waves to create an interference pattern that contains information about the object being studied. This disclosure and based on the interferometric concept applies techniques to directly measure the phase difference between two mm-wave signal sources. As shown in FIGS. 2A and 2B, a reference source and a target oscillator simultaneously drive left and right terminals of a transmission line. The two sources may have the same (FIG. 3A) or opposite polarities (FIG. 3B) in this scheme. In the example of FIGS. 3A and 3B, the left and right sources are impedance matched to the transmission line and have the same amplitude and frequency to analyze and describe the behavior of the interference pattern.

The reference source on the left would generate a traveling wave along the transmission line propagating from left to right:

$$S_L(x,t)=A\cos(\omega t-\beta x), 0 \leq x \leq L, \qquad (1)$$

whereas the oscillator on the right generates a traveling wave propagating from right to left:

$$S_L(x,t)=A\cos(\omega t+\beta x-\beta L+\Delta\phi), 0 \leq x \leq L, \qquad (2)$$

Here, A and ω are the amplitude and the angular frequency of the two signal sources, β is the phase constant of the traveling waves and L is the length of the transmission line. Define Δϕ as the phase difference between the oscillator connected to the right end of the transmission line with respect to the reference source on the left side. The two traveling waves propagating in the opposite directions would interfere and generate a standing wave along the transmission line. A standing wave results from the summation of (1) and (2):

$$S(x,t)=S_R(x,t)+S_L(x,t). \qquad (3)$$

The example interferometers may have two specific patterns depending on the relative polarity between the two sides. When the two sides have the same polarity, e.g., FIG. 3A, results in:

$$S(x,t)=2A\cos(\beta x+\Delta\phi')\cos(\omega t+\Delta\phi') \qquad (4)$$

$$\Delta\phi'=\tfrac{1}{2}(\Delta\phi-\beta L), \qquad (5)$$

When the two sides have the opposite polarity, e.g., FIG. 3B, results in:

$$S(x,t)=2A\cos[\beta(x+\tfrac{1}{4}\lambda)+\Delta\phi']\cos(\omega t+\Delta\phi'+\tfrac{1}{2}\pi) \qquad (6)$$

In the same-polarity scenario, the term $2A\cos((\beta x+\Delta\phi')$ in (4) represents the envelope of the interference pattern distributed across the transmission line as a function of Δϕ. When Δϕ=0, the peak of the interference pattern appears at the center of the transmission line, as shown in FIG. 3A. As Δϕ changes, this peak would move to the left for Δϕ>0 or the right for Δϕ<0. As shown in FIG. 3B, the same dynamic occurs in the opposite-polarity scenario, whereas (6) indicates the interference patterns generates a valley at the same place. In this disclosure the term "turning point," in the case of same-polarity, the turning point is defined as the location of the peak, while in the case of opposite-polarity, it is the location of the valley.

From (4-5), calculate $x_{TP}$, the coordination of this turning point to be:

$$x_{TP} = \frac{L}{2} - \frac{\Delta\phi}{4\pi}\lambda + \frac{k}{2}\lambda \qquad (7)$$

where k=0, +1, +2 . . . , $0 \leq x_{TP} \leq L$.

From (7), due to the linear relationship, one can predict the phase Δϕ by directly measuring $x_{TP}$.

Figure 4:
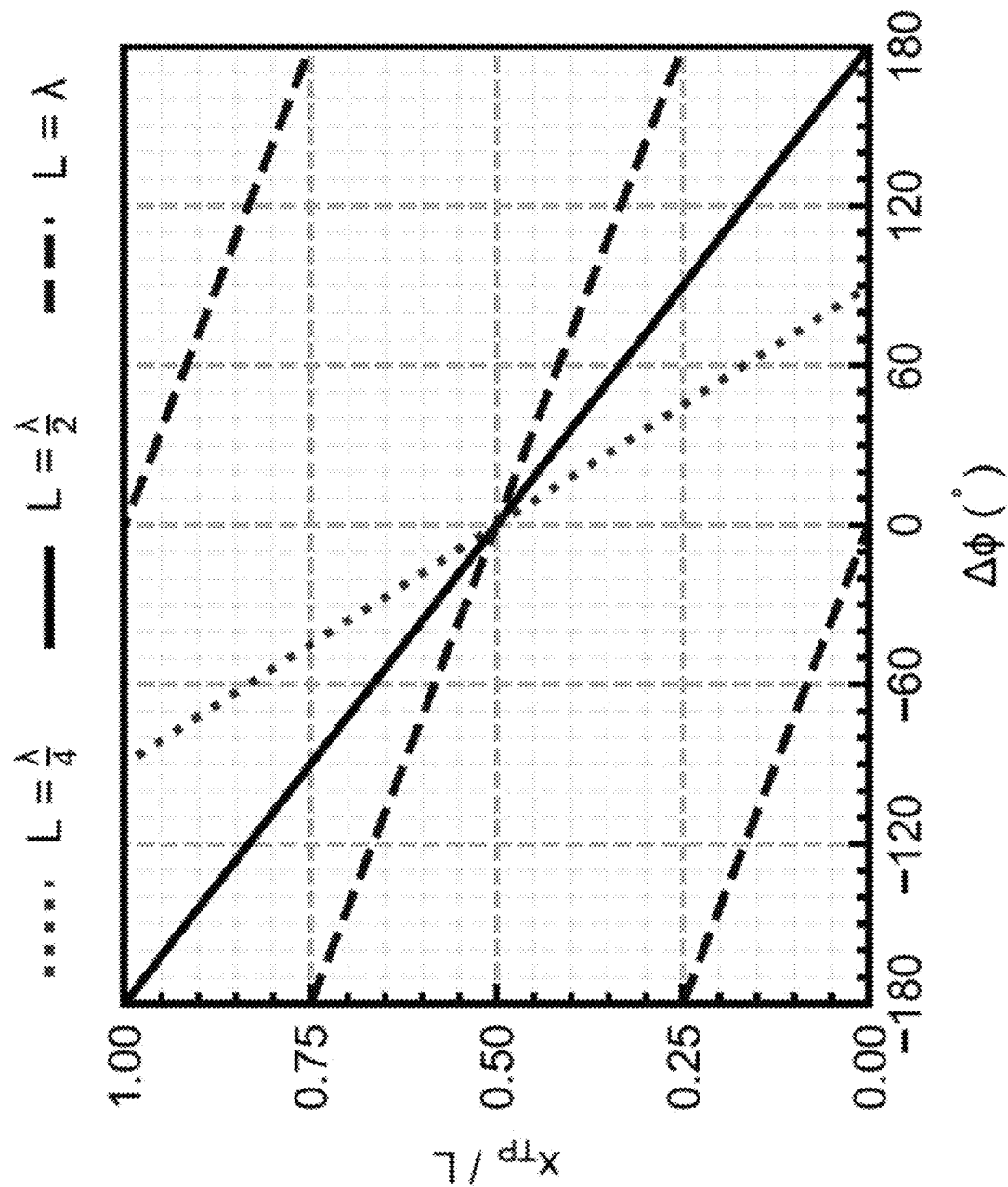
FIG. 4 is a graph illustrating the normalized location of the turning point as a function of Δϕ for three different lengths of the transmission line: λ/4, λ/2, and λ.

FIG. 4 is a graph illustrating the normalized location of the turning point as a function of Δϕ for three different lengths of the transmission line: λ/4, λ/2, and λ. As shown in the example of FIG. 3A, when the two sources are in phase, the turning point appears at the center of the transmission line and shifts away when there is a non-zero phase difference between the two sources.

Furthermore, the example of FIG. 4 shows two observations. First, the turning point appears periodically every half-wavelength. To ensure one-on-one mapping between $x_{TP}$ and Δϕ, the length of the transmission line, L should not exceed half the wavelength. Second, since the measurable values of $x_{TP}$ are restricted to [0, L], L determines the detectable range of Δϕ. Based on (7), the detectable range is:

$$-\frac{2\pi L}{\lambda} \leq \Delta\phi \leq \frac{2\pi L}{\lambda} \qquad (8)$$

As a result, if one uses the maximum allowable length of λ2, the interferometer detects the entire 2π range of Δϕ. Assuming there are P phase detectors evenly distributed across the line, the phase detector can adjust the phase difference between the two sources at increments of Δϕ/(P−1).

Figure 5:
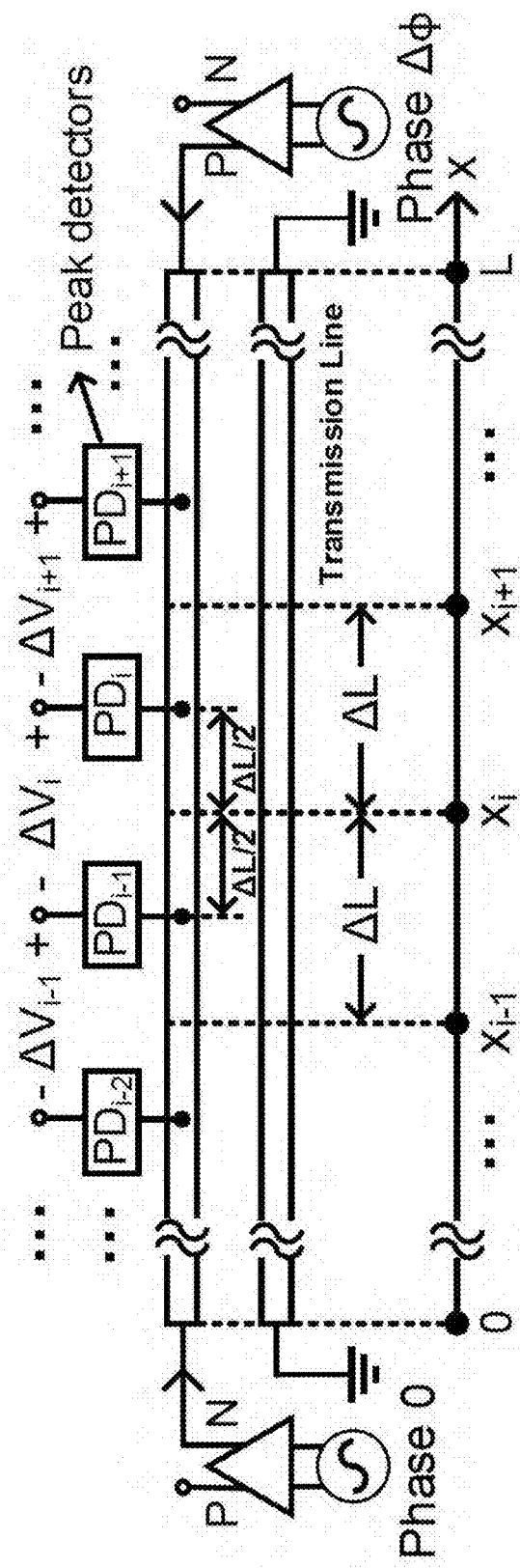
FIG. 5 is a conceptual diagram illustrating an example phase detector based on multiple peak detectors distributed along a transmission line.

FIG. 5 is a conceptual diagram illustrating an example phase detector based on multiple peak detectors distributed along a transmission line. The proposed interferometer provides a direct mapping between phase and xTP. The mm-wave phase detector is implemented based on this mechanism and by measuring the position of xTP in the transmission line. In the example of FIG. 5, a series of peak detectors are evenly distributed across the transmission line. The distance between the ith and (i−1)th peak detectors is ΔL (ΔL<<L), and $x_i$ refers to their midpoint location.

The peak detector converts the mm-wave input signal of an amplitude Vin into a DC output, Vout. Using linear expansion, this conversion can be estimated as:

$$G_{PD} = \frac{dV_{out}}{dV_{in}} \quad (9)$$

where GPD represents the RF-to-DC gain of the peak detector.

Next, select the pair of peak detectors located at $x_i \pm \Delta L/2$ and measure ΔVi, the voltage difference between their outputs. When the selected pair of peak detectors produces ΔVi=0 then xTP=xi. When the Δϕ changes, it pushes xTP away from xi and changes ΔVi accordingly.

Figure 6A:
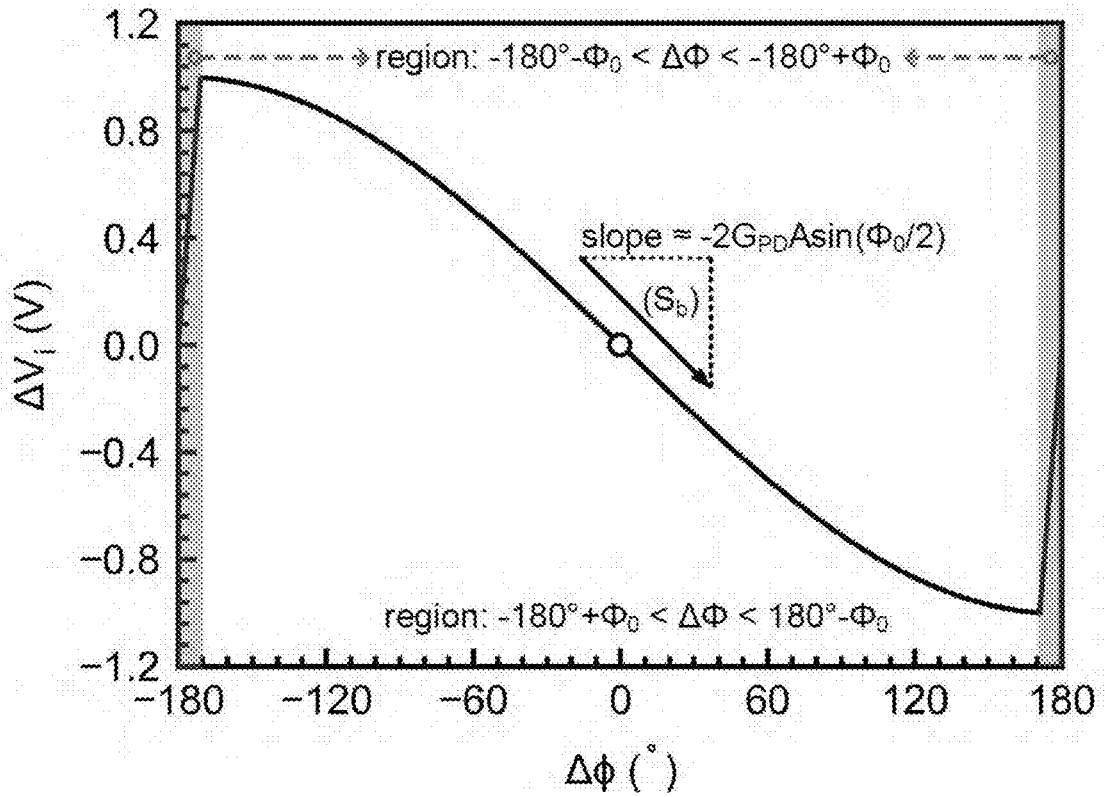
FIG. 6A is a graph illustrating a characteristic of the phase detector of this disclosure, e.g., theoretical relationship between Δϕ and $V_i$ in the same-polarity scenario when $x_i=\frac{1}{2}L$.

FIG. 6A is a graph illustrating a characteristic of the phase detector of this disclosure, e.g., theoretical relationship between Δϕ and Vi in the same-polarity scenario when $x_i = \frac{1}{2}L$. Analyze the relationship between ΔVi and Δϕ under a special case, xi=L/2. In the same-polarity scenario, derive ΔVi to be:

$$\Delta V_i = \begin{cases} K\cos\left(\frac{\phi_o}{2}\right)\cos\left(\frac{\Delta\phi}{2}\right), & -\phi_o \le \Delta\phi + \pi \le \phi_o \\ K\sin\left(\frac{\phi_o}{2}\right)\sin\left(\frac{\Delta\phi}{2}\right), & \phi_o \le \Delta\phi + \pi \le -\phi_o \end{cases} \quad (10)$$

where K=4GPDA, and ϕo=βΔL.

Figure 6B:
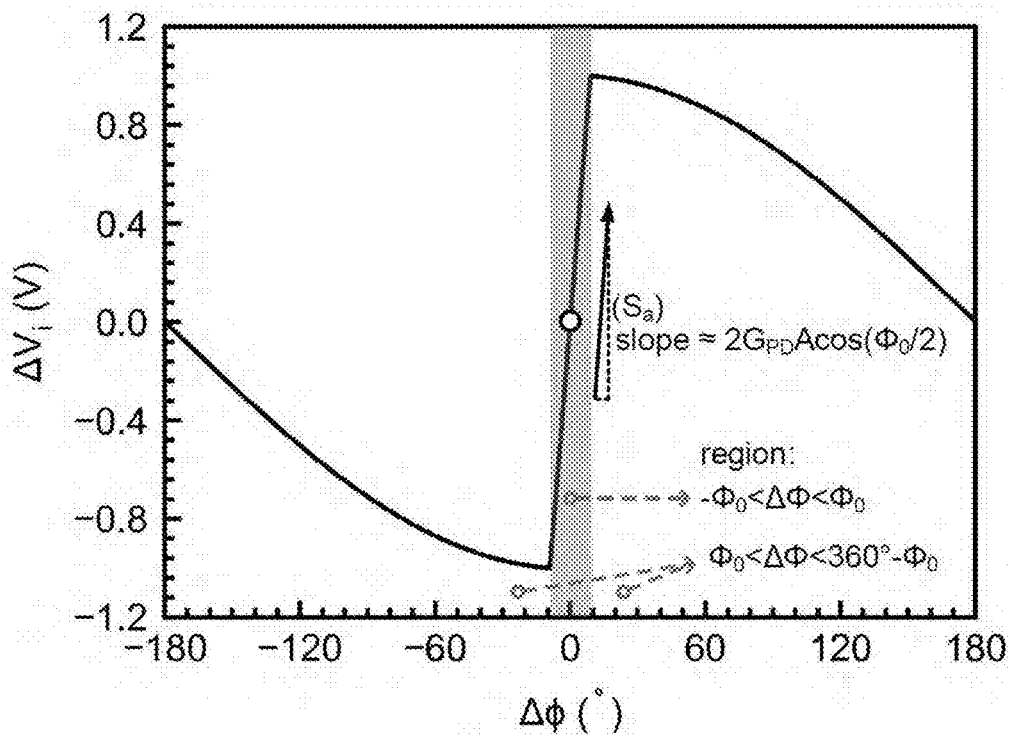
FIG. 6B is a graph illustrating a characteristic of the phase detector of this disclosure, e.g., the simulated ΔVi as a function of Δϕ with the opposite-polarity connection, where i represents a specific pair of peak detectors.

FIG. 6B is a graph illustrating a characteristic of the phase detector of this disclosure, e.g., the theoretical relationship between Δϕ and Vi in the opposite-polarity scenario $x_i = \frac{1}{2}L$. Similar to FIG. 6A, in FIG. 6B the opposite-polarity scenario results in:

$$\Delta V_i = \begin{cases} K\cos\left(\frac{\phi_o}{2}\right)\sin\left(\frac{\Delta\phi}{2}\right), & -\phi_o \le \Delta\phi \le \phi_o \\ K\sin\left(\frac{\phi_o}{2}\right)\cos\left(\frac{\Delta\phi}{2}\right), & \phi_o \le \Delta\phi \le 2\pi - \phi_o \end{cases} \quad (11)$$

By comparing these two scenarios, the Δϕ-to-ΔVi characteristic of the two cases only differs by a phase shift of π. Furthermore, ΔVi has two zero-crossings across Δϕ. From the above equations, the approximate slope at these two zero-crossings may be Sa=K/2 cos(ϕo/2) and Sb=−K/2 sin(ϕo/2), which for βΔL<<1 can be further simplified to Sa=K/2 and Sb=−KββL/4.

When comparing these two zero-crossings, a larger slope provides a higher small signal conversion gain in the Δϕ-to-ΔVi relationship. This in term results in a proportionally higher phase sensitivity and lower phase error. Since Sa>>Sb, it is the desirable zero-crossing for phase detection. From FIGS. 6A and 6B, the location of Sa depends on the polarity of excitation. For the opposite-polarity case, Sa occurs at Δϕ=0, while for the same-polarity case, Sa occurs at Δϕ=π. Since phase tuning normally occurs around Δϕ=0, the opposite-polarity mode may provide superior performance compared to the same-polarity mode.

In the general case where the chosen x, is any value within [0, L], use equation (6) to derive a modified equation for the location of the zero-crossings. The zero-crossing corresponding to Sa appears at:

$$\Delta\phi = 2\beta\left(x_i - \frac{L}{2}\right) \quad (12)$$

where in the special case of xi=L/2 above, this results in the zero-crossing at Δϕ=0. Based on this general relationship, the topology in FIG. 5 may measure Δϕ based on the measured ΔVi from the chosen pair of detectors. In this scheme, by selecting a specific pair among the available sets of evenly distributed detectors along the line the processing circuitry of the system of this disclosure may set the zero-crossing of the phase detector to the desired value, e.g., to steer the beam in the desired direction.

Figure 6C:
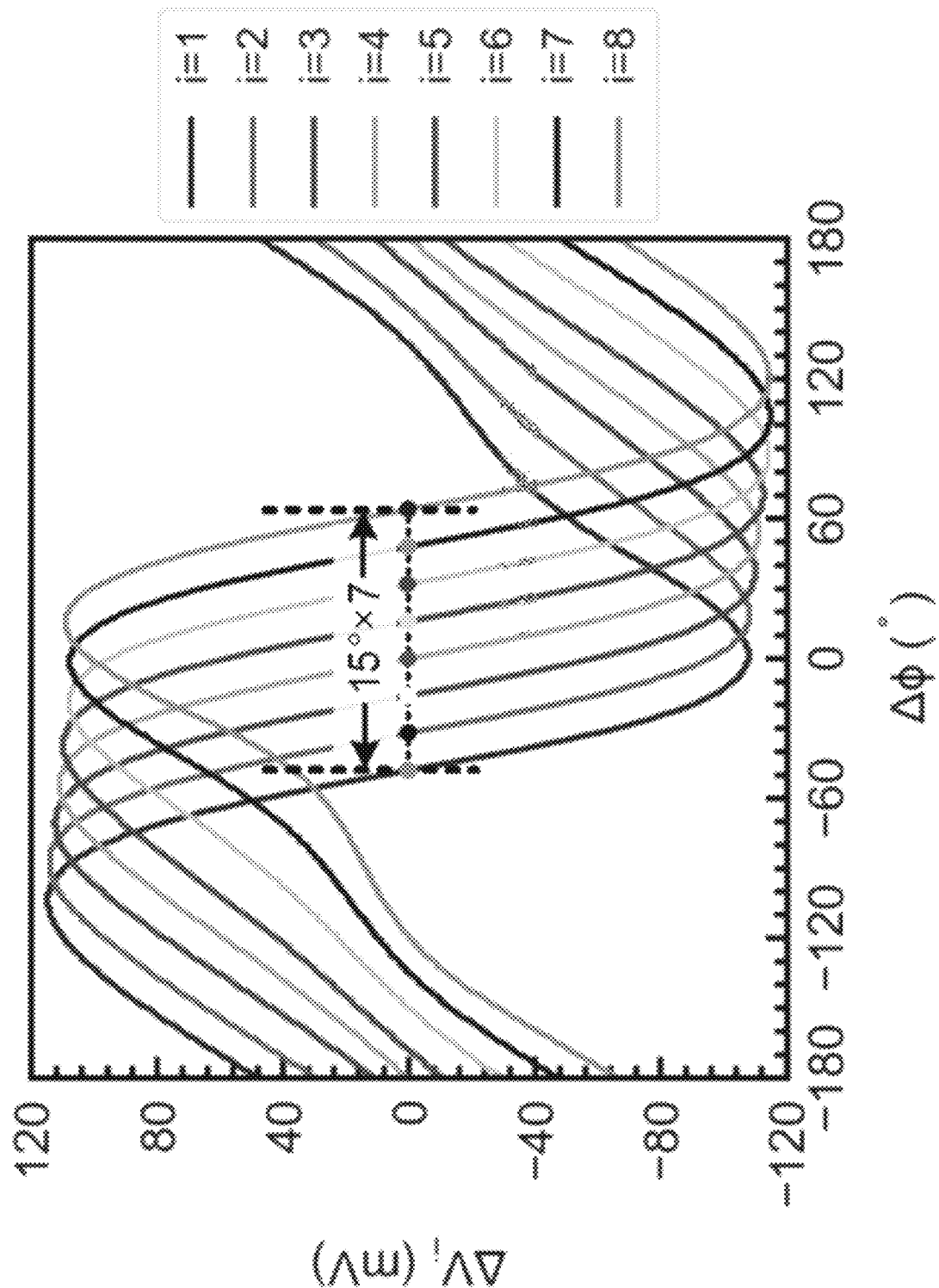
FIG. 6C is a graph illustrating circuit simulation results of the phase detector of this disclosure with programmable phase characteristic.

FIG. 6C is a graph illustrating circuit simulation results of the phase detector of this disclosure with programmable phase characteristic. The Sa is negative at the zero-crossing in FIG. 6C because of the negative conversion gain of the implemented peak detectors. Furthermore, eight different settings for zero-crossings are selected from nine peak detectors distributed on a transmission line. The proposed mm-wave phase detector has several advantages over conventional logic-based phase detectors. First, by measuring the phase difference directly at the target frequency, the proposed phase detector avoids the phase error multiplication effect as described above. Second, this systems operating according to the techniques of this disclosure may be more power efficient for mm-wave detection than other examples of phase control because in this disclosure the power-hungry active modules such as frequency dividers and sub-sampling switches in conventional PLLs are replaced with a direct mm-wave to DC conversion module. Finally, employing a transmission line as the core sensing component connecting the adjacent sources absorbs any delay due to signal routing into the phase measurement.

Figure 7A:
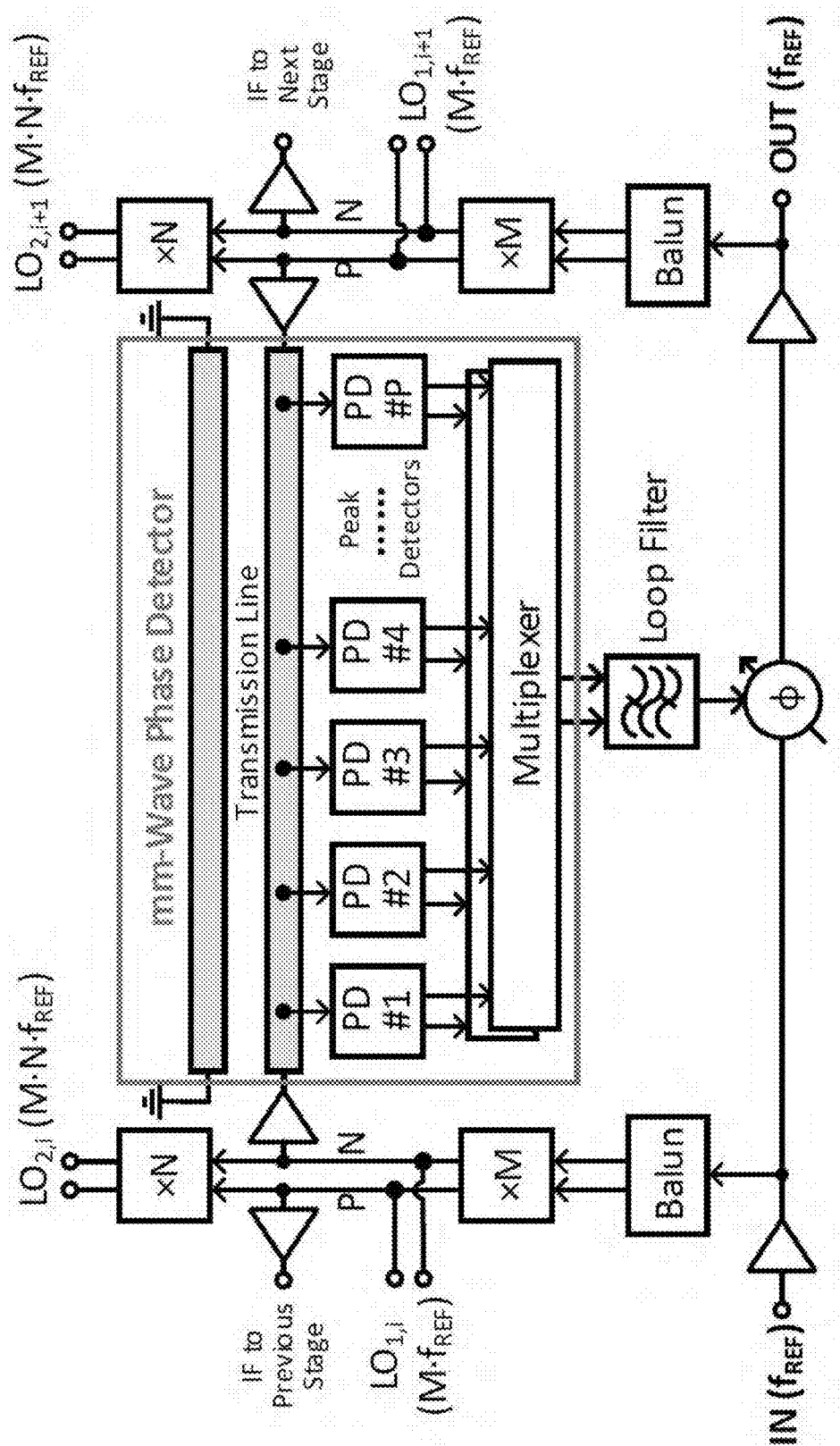
FIG. 7A is a schematic and block diagram illustrating an example implementation of an architecture of a 1×2 array with phase self-alignment.

FIG. 7A is a schematic and block diagram illustrating an example implementation of an architecture of a 1×2 array with phase self-alignment. The example of FIG. 7A describes one possible example of a mm-wave scalable phase synthesizer based on the methodology shown in FIG. 1. In this scheme, the phase is detected at the target mm-wave frequency and controlled at the frequency of the input reference (baseband) signal. First, the interferometer-based phase detector may directly measure the phase difference between the two mm-wave sources without any frequency division as described above. Next, the phase shifter operating at the reference frequency controls the phase achieve phase alignment between each respective two mm-wave sources based on the measured phase difference, and the selected peak detectors, as described above in relation to FIGS. 2C and 5.

FIG. 7A, illustrates the architecture of a two-element array featuring the proposed phase self-alignment. The mm-wave source is implemented using a ×M frequency multiplier from the reference signal. The frequency at the input and output of the frequency multiplier is $f_{ref}$ and $M \cdot f_{ref}$, respectively. The outputs of the two ×M frequency multipliers in the array are synchronized in frequency. However, due to routings and error multiplication in the signal path the two mm-wave sources may initially have an arbitrary phase difference. As the first step toward phase alignment, the interferometer-based phase detector may detect the phase difference between the two mm-wave sources. In the example scheme of FIG. 7A, the differential output of each multiplier drives two 50Ω buffers. To form the interferometer in this example, connect a 50Ω transmission line between opposite-polarity buffers from the two multipliers.

In other examples, the buffers and transmission lines may have different impedance values. As a result, an interference pattern described in FIG. 3B is generated along the transmission line.

The phase detector measure the interference pattern using P peak detectors distributed along the transmission line. As discussed in above, e.g. in relation to FIG. 6C, each pair of peak detectors corresponds to a specific zero-crossing, $\Delta\phi$, in the phase detector. Therefore, P peak detectors introduce (P−1) phase settings. The phase detector includes use a P-to-2 analog multiplexer to select the two detectors associated with a specific phase setting. The two outputs from the multiplexer connect to a loop filter. Each multiplexor may be configured to receive outputs from each peak detector of the plurality of peak detectors as well as to select the two peak detectors, e.g., from processing circuitry 54 described above in relation to FIG. 2C.

The loop filter may be filter circuitry that is configured to receive outputs from the multiplexor comprising the difference between the first peak detector and the second peak detector and integrates the difference between two selected peak detectors while removing high frequency spurs. The loop filter output controls a phase shifter between the two sources. This phase shifter adjusts the phase difference between the two references applied to the left and right multipliers based on the output received from the loop filter. This results in a negative feedback loop between the phases of the two mm-wave sources. The loop settles to its equilibrium when $\Delta\phi$ becomes equal to the phase difference defined by (12). Although the system has two zero-crossings corresponding to Sa and Sb, only one would result in a stable equilibrium due to their opposite signs. In the design of this disclosure, the feedback polarity may set the loop to a desired zero-crossing, e.g., corresponding to Sa.

To extend the frequency beyond the operating frequency of the interferometer operation, in some examples the system may include a second frequency multiplier stage with a scaling factor of N, connected to the output of the ×M multiplier. This second multiplier may generate LO signals at $M \cdot N \cdot f_{ref}$, as shown in FIG. 7A while decoupling the LO frequency from the mm-wave phase detector. In this case, the two sources are still phase-aligned, and their phase difference would be $N \cdot \Delta\phi$.

The arrangement of FIG. 7A may be extended for 2D scalable self-aligning phased arrays.

Figure 7B:
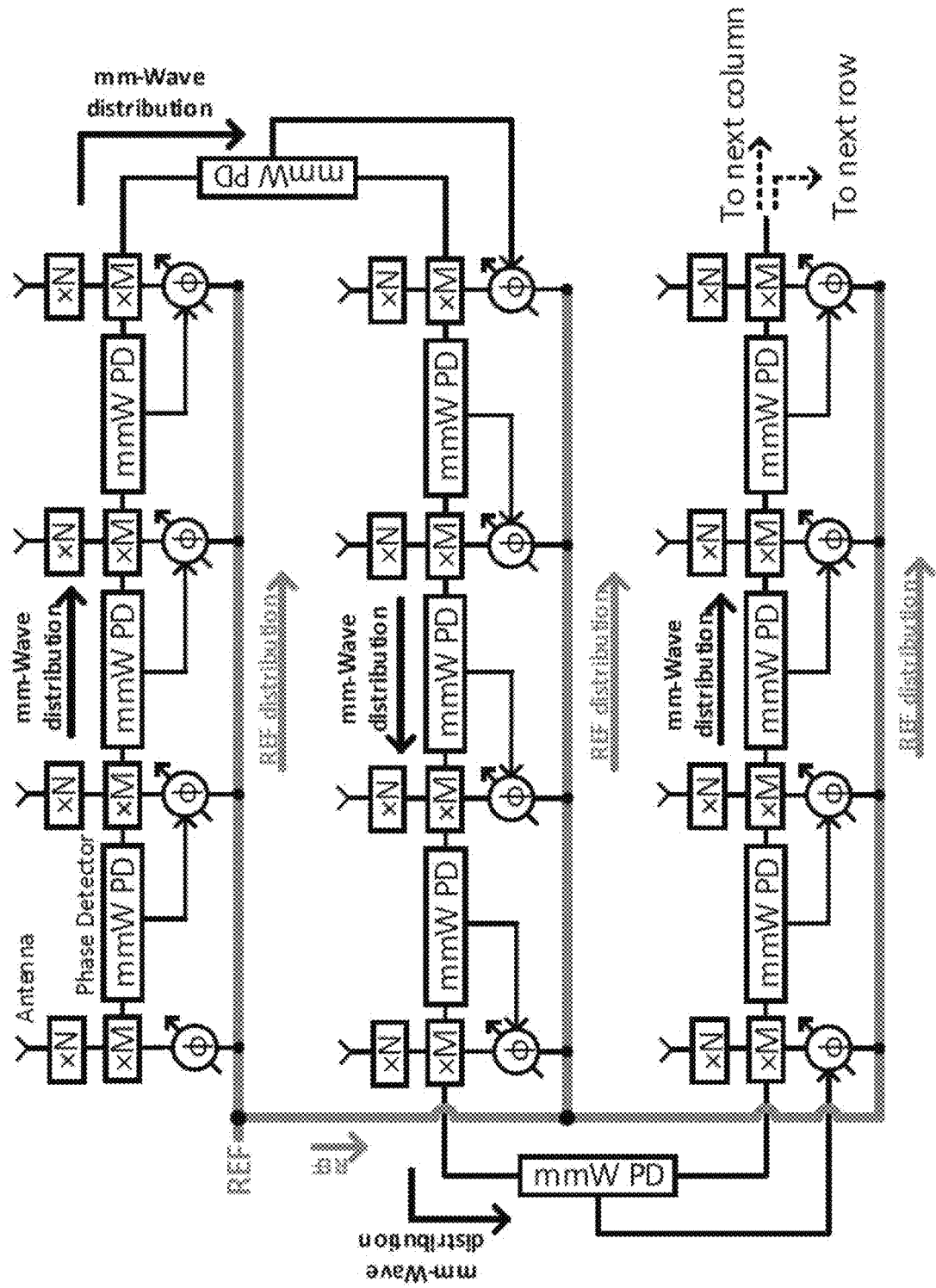
FIG. 7B is a schematic and block diagram illustrating an example implementation of a scalable phased array based on an array with phase self-alignment.

FIG. 7B is a schematic and block diagram illustrating an example implementation of a scalable phased array based on an array with phase self-alignment. FIG. 7B presents an architecture for such an array by cascading multiple stages of the circuit of FIG. 7A in a daisy chain topology. In this scheme a clean low frequency reference signal is distributed to all elements while phase alignment is performed at high frequency and between adjacent mm-wave sources. Since the dimensions of the interferometer scale down with frequency, such an architecture is suitable for large-scale mm-wave and THz phased arrays.

Figure 8:
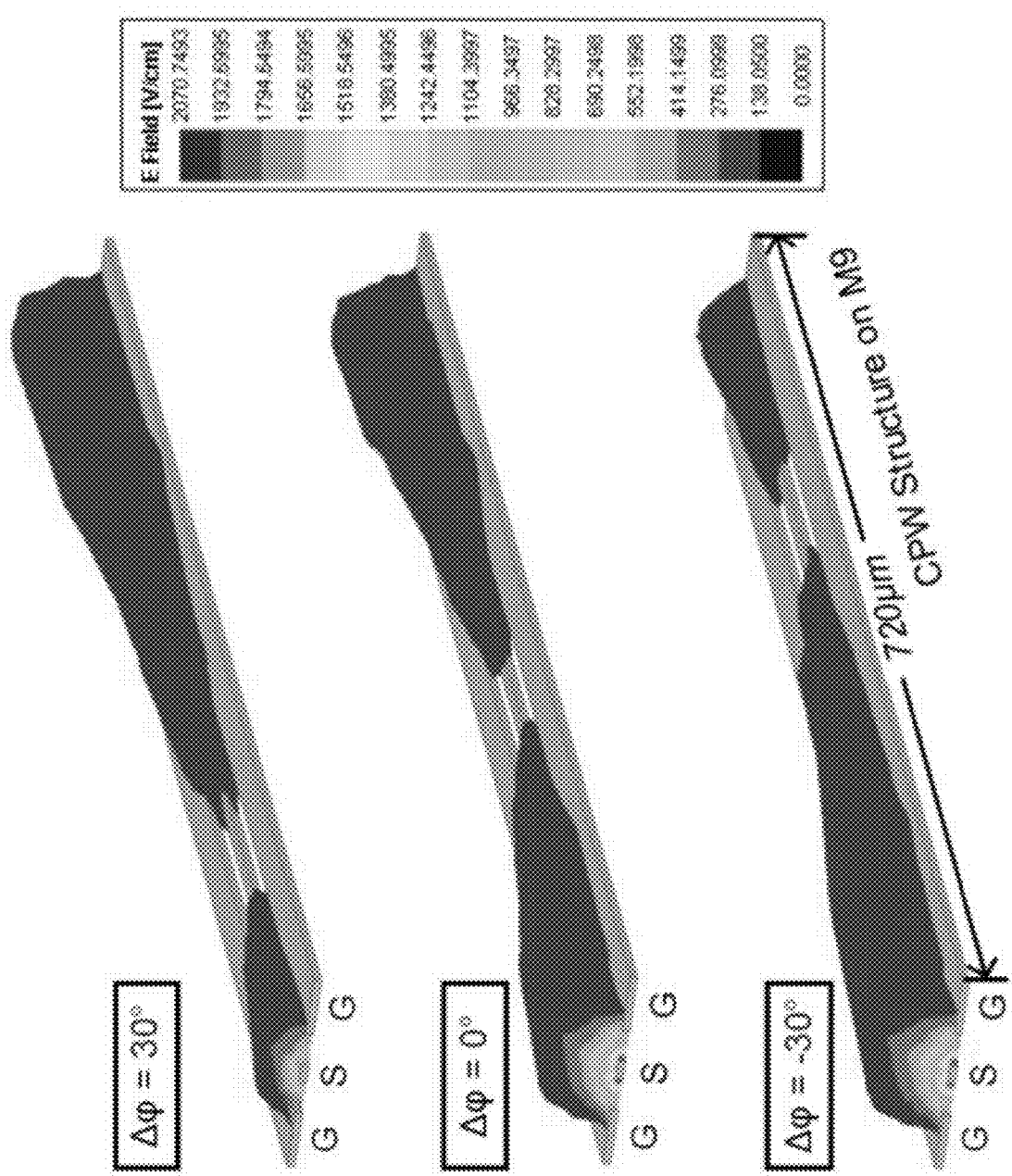
FIG. 8 is an electro-magnetic (EM) simulation of the electric field distribution on the co-planar waveguide (CPW) line as a function of Δϕ.

FIG. 8 is an electro-magnetic (EM) simulation of the electric field distribution on the co-planar waveguide (CPW) line as a function of $\Delta\phi$. The example of FIG. 8 shows the location of the valley as a function of $\Delta\phi$ for a two-element prototype of the proposed phase self-aligning array used to verify the concept of this disclosure described above in relation to FIG. 7A and FIG. 3B. The example prototype used multiplication factors of M=5 and N=2 for the multiplier chain. The reference frequency is 7 GHz resulting in 35 GHz and 70 GHz multiplier outputs.

The prototype example interferometer of FIG. 7A used a 50Ω coplanar waveguide (CPW) structure with signal line width and gap of 10 μm and 17 μm, respectively. The transmission line has a total length of 720 μm. With the help of HFSS 3D electromagnetic simulator to characterize the electrical field pattern with different values of $\Delta\phi$ between the interfering signals on the two sides. Based on (8), the line length corresponds to a phase tuning range close to 105° at 35 GHz. As (8) indicates, the smallest phase step depends on the proximity of adjacent peak detectors, $\Delta L$. Thus, the number of peak detectors across the line is a design trade-off between the smallest phase step and the capacitive loading of the detectors on the transmission line. In this example prototype included P=9 evenly distributed peak detectors across the line resulting in an expected phase step of 15° from the P−1 distinct phase settings. This phase step is verified by simulation results, as shown in FIG. 6C. As described above, choose the desired pair of detectors from a P-to-2 multiplexer based on complementary transmission gates to select the desired phase setting.

The prototype used for simulation and testing for the selected frequency scaling factors M and N, the results showed a frequency scaling from 7 GHz to 70 GHz. In this example, M should be larger than N, since any residual phase error at the output of the ×M is going to further scale by N at the output of the ×N multiplier. Thus, in this prototype design, used M=5 and N=2. A benefit of choosing a quintupler over a doubler or tripler is achieving a high-frequency conversion factor in a single stage.

The frequency multiplier chain of the prototype included an active balun, followed by a chain of inverters and an amplifier at 35 GHz. The active balun consists of two stages of differential amplifiers and may act as a signal splitter. As shown in FIG. 7A, the balun may include an input terminal and two output terminals. The balun connects to the baseband frequency at the input terminal and may output the baseband frequency from the first output terminal with a first polarity; and output the baseband frequency from the second output terminal with a second polarity opposite to the first polarity.

The input reference feeds one input of the differential pair while the other is AC grounded. The combination of the tail current output impedance and the common-mode feedback resistor may help to suppress the input common-mode. Given the reference's relatively high frequency, this prototype used two cascaded stages that provide sufficient common-mode rejection to generate a balanced output signal. The following chain of inverters clips the waveform and enriches the fifth tone. Three frequency-tuned amplifiers further boost this harmonic.

Furthermore, LC filters in the amplifiers may suppress undesired harmonics at the output. The biasing of the amplifier of this example prototype was optimized to maximize the fifth harmonic, and the use of the cascode topology helps increase the drain-gate isolation for achieving unconditional stability. Compared to injection locking methods, the use of amplifiers to boost the harmonic provides a more robust and wide bandwidth solution without any need for frequency tuning and calibration. The three-stage differential amplifier is followed by two single-ended buffers that drive the transmission line with the desired polarity. The output buffers are impedance matched to the transmission line in order to create the desired interference pattern across all phase settings. Furthermore, the buffers are biased as class A amplifies to minimize distortion on the interference pattern due to higher order harmonics.

The simulated 3-dB bandwidth of the frequency quintupler is 33.5 GHz-38.5 GHz. A frequency doubler follows the quintupler to generate the 70 GHz signal. The doubler uses a push-push topology that cancels the fundamental tone and combines the second harmonics at its output. The biasing of the doubler is optimized for second-harmonic power. The doubler output is conjugate matched to the next stage for maximum power gain. The following three-stage common-source power amplifier enables the frequency multiplier output to drive a 50Ω with sufficient amplitude.

Following the phase difference detection and as part of the loop operation, the Gm-C cell integrates the difference between the outputs of the two selected peak detectors. As shown in FIG. 7A, the output of the Gm-C cell controls a phase-shifter which adjusts the delay between the reference signals on the two sides. This provides a negative feedback loop between the two mm-wave sources. The loop settles to the designated phase difference, $\Delta\phi$ in equilibrium, as described above in relation to FIG. 7A.

The Gm-C cell uses a folded-cascode OTA with a simulated DC gain of 47 dB and a dominate pole at 125 KHz, which is much smaller than the loop bandwidth. This ensures that the response of this Gm-C cell closely follows that of an ideal integrator. The phase shifter is based on a chain of varactor loaded inverters. By adjusting the time constant of each stage, the phase shifter of this example prototype achieves a simulated delay tuning range of 32 ps which provides more than $2\pi$ phase tuning at our target 35 GHz frequency. For the opposite polarity scenario in this example, the in-phase setting of i=4 corresponds to an expected $\Delta\phi=180°$ between the quintupler outputs and $0°$ phase difference between the doubler outputs. The simulated RMS phase error is $<2°$ across the operating bandwidth.

In this design, the differential output of a selected pair of the peak detectors is responsible for detecting the interference pattern. Due to its differential nature, this detection is relatively robust to PVT variations. However, any random mismatch between the characteristics of the peak detectors directly impacts the phase detection accuracy. The primary two sources of this mismatch are the input device and the load capacitor. These two sources of mismatch collectively introduce a random voltage error, Ev, in the output voltage of each peak detector. However, once the loop settles, such a shift in the voltage translates into a proportional phase error, $E\phi$, in the $\Delta\phi$.

Figure 9:
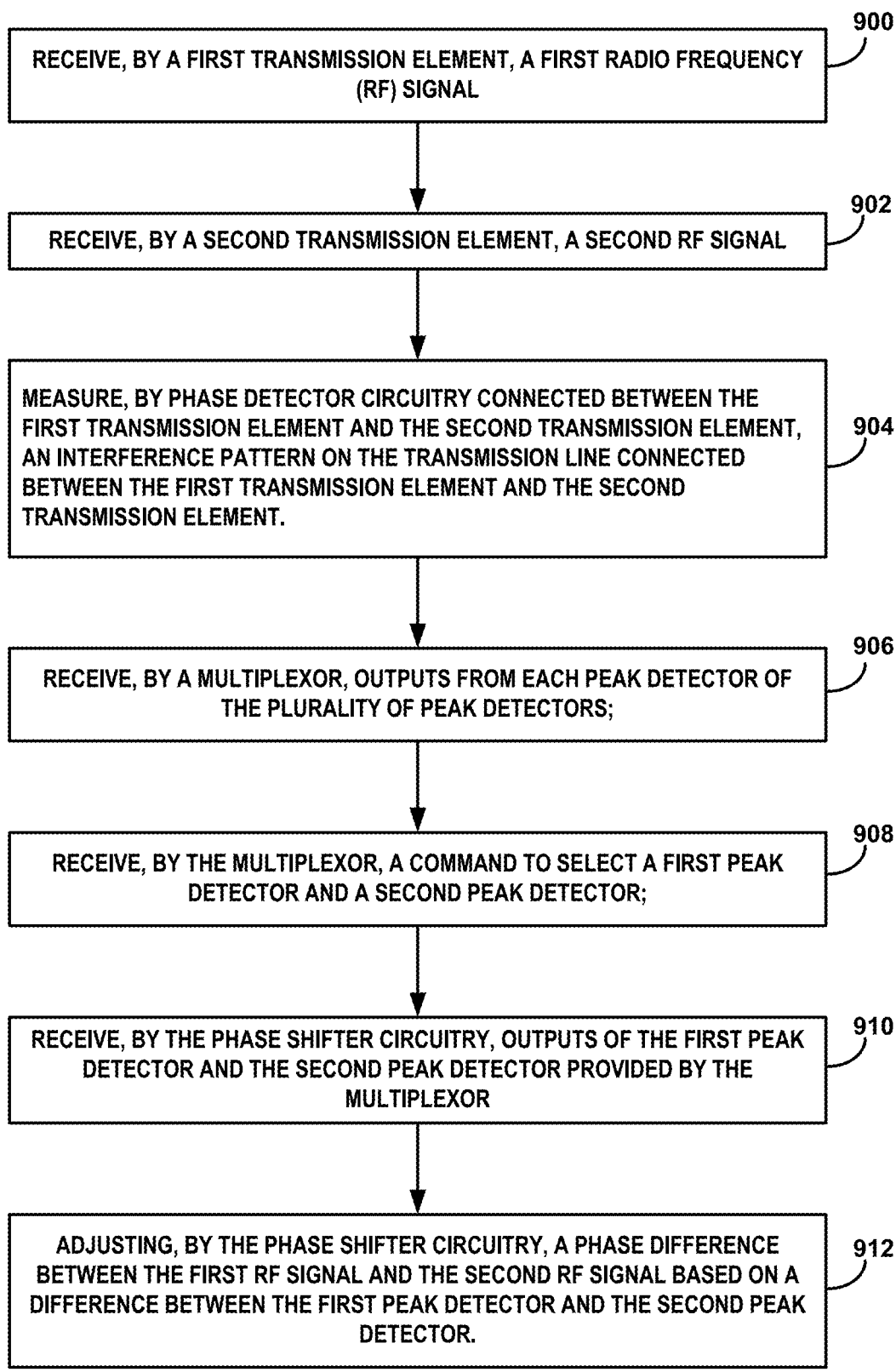
FIG. 9 is a flow chart illustrating an example mode of operation of the system of this disclosure.

FIG. 9 is a flow chart illustrating an example mode of operation of the system of this disclosure. The blocks of FIG. 9 will be described in terms of FIG. 7A, unless otherwise noted.

A transmission element, e.g., an antenna as depicted in FIG. 7B, may receive an RF signal for wireless transmission. In the example of FIG. 7A, a first transmission element may connect to $LO_{2,i}$, and receive a first radio frequency (RF) signal from $LO_{2,i}$ (900). A second transmission element may connect to $LO_{2,i+1}$, and receive a second RF signal (902). The first RF signal and the second RF signal may be based on a baseband signal and have the same frequency $f_{ref}$.

Phase detector circuitry connected between the first transmission element and the second transmission element, may measure an interference pattern on the transmission line connected between the first transmission element and the second transmission element (904). As described above in relation to FIG. 7A, the phase detector circuitry comprises the transmission line, and a plurality of peak detectors arranged along the transmission line. The interference pattern is on the transmission line, and the plurality of peak detectors may be evenly spaced along the transmission line to measure the interference pattern on the transmission line caused by the first RF signal and the second RF signal.

The multiplexor may receive outputs from each peak detector of the plurality of peak detectors (906). The multiplexor may also receive a command to select a first peak detector and a second peak detector from the plurality of peak detectors (908). In some examples the command may come from processing circuitry as described above in relation to FIG. 2C. The selected peak detectors may be based on the desired phase difference between the two transmission elements to output a desired beam angle.

The phase shifter circuitry may receive the outputs of the first peak detector and the second peak detector provided by the multiplexor (910). In some examples, the phase shifter circuitry may receive the outputs of the first peak detector and second peak detector via a loop filter. The loop filter may integrate the difference between the two selected peak detectors, remove high frequency spurs; and output the filtered and integrated difference between the first peak detector and the second peak detector to the phase shifter. The phase shifter circuitry may adjust a phase difference between the first RF signal and the second RF signal based on a difference between the first peak detector and the second peak detector, as described above in relation to FIGS. 7A, 7B and 8 (912).

FIGS. 10-15D illustrate one example implementation of the scalable self-aligning phased array of this disclosure using multiple integrated circuits and patch antennae. Any dimensions, simulation or measurements values are just shown as possible example values to illustrate the structure and operation of the multiple IC implementation for the phased array of this disclosure. For example, the dimensions and spacing of the antenna may differ for other examples that use different operating frequencies than the frequencies listed in the description of FIGS. 10-15D.

Figure 10:
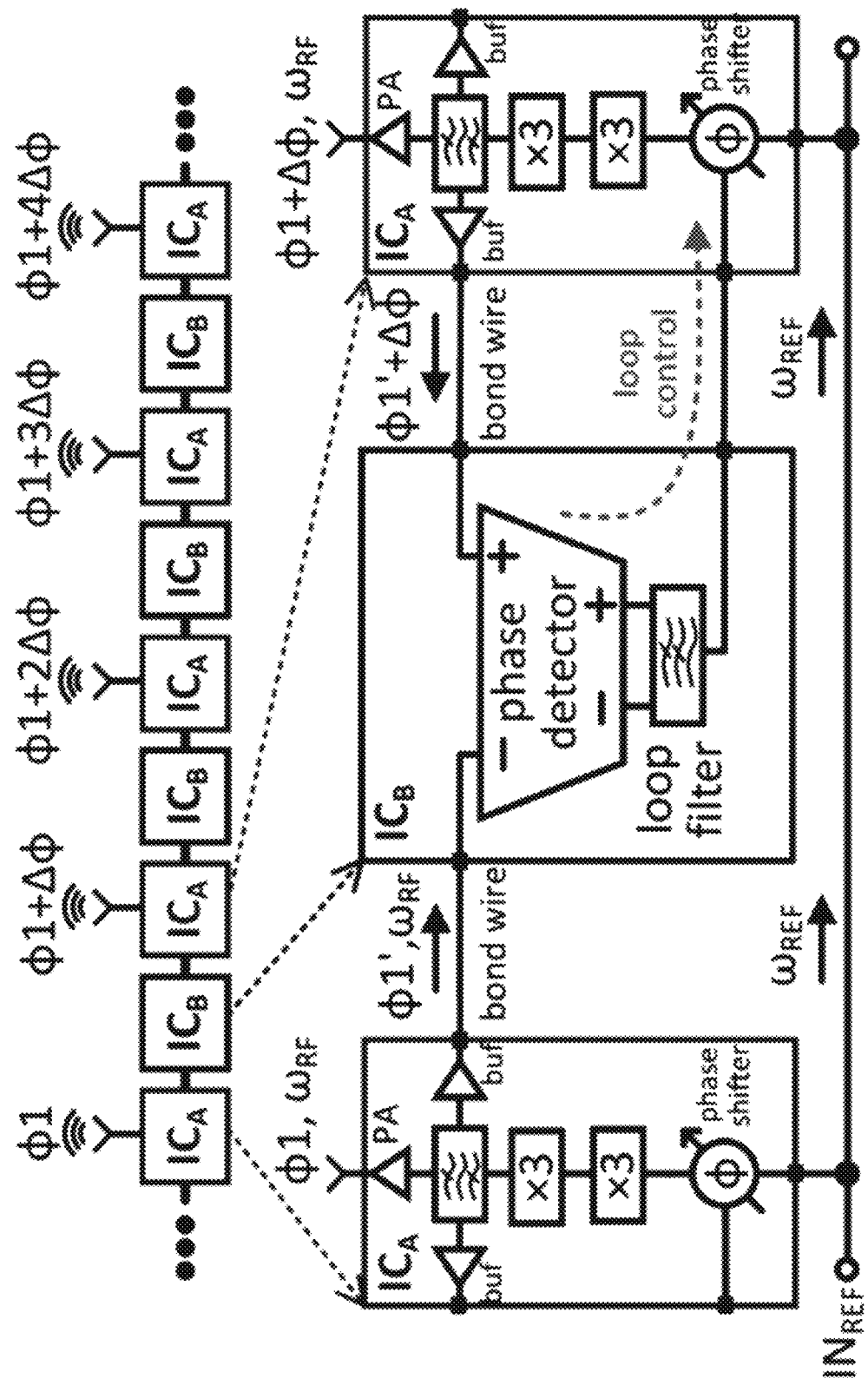
FIG. 10 is a schematic and block diagram illustrating an example arrangement of scalable phased array based on two types of ICs.

FIG. 10 is a schematic and block diagram illustrating an example arrangement of scalable phased array based on two types of ICs. In this disclosure an integrated circuit by be referred to either as an IC or as a chip and either term may be used interchangeably. The two types of ICs include ICA and ICB in the example of FIG. 10. The ICA generates and radiates mm-wave signals, and ICB detects and controls the phase difference of adjacent ICA's to achieve phase self-aligning between chips.

As described above in relation to FIGS. 1-9, the multi-chip arrangement is a scalable phased array architecture based on background phase alignment between nearest neighbor ICs. The arrangement implements an interferometric phase monitoring scheme in a multi-chip array configuration with chip-to-chip bonding between adjacent modules. One example prototype 1×7 phased array includes seven transmitter chips (ICA) and six control chips (ICB). In some examples, the array demonstrated a measured ±30° beam steering consistent with 210° measured phase tuning range between adjacent neighbors. The example prototype demonstrated transmitter phase noise of −114.6 dBc/Hz at 1 MHz offset at 30 GHz and operates across a 16.7% fractional bandwidth.

The passive phase detection scheme based on direct interferometry described above in relation to FIGS. 1-9 demonstrated reliable phase accuracy between two elements on a single chip. The example of FIG. 10 illustrates an implementation of the scalable mm-wave phased array. The multi-chip array is also configured to maintain phase coherence and demonstrate beam steering based on direct frontend phase correction. In this manner, the multi-chip example array may also scale both within a single chip and between multiple chips through a nearest neighbor, and energy efficient phase calibration and tuning scheme.

The multi-chip phase self-alignment scheme is implemented with a structure in a sequence of two types of modules forming a 1-D array. Each example of module A (ICA) performs signal generation and acts as the transmitting element while module B (ICB) performs phase alignment and control. Each pair of adjacent transmitting elements, ICA, connects to a phase monitoring and control module, ICB, located between the ICA modules. The interferometric phase detection for ICB is based on direct measurement of the phase difference between these adjacent module A transmitters. The produced mm-wave signal from each element is fed through an impedance-matched transmission line in the monitoring module. The two signals, $\varphi'$ and $\varphi'+\Delta\varphi$, propagating in opposite directions form an interference pattern which is further processed for controlling the phase difference between two neighboring transmitters.

The phase between adjacent elements of the array is adjusted through a local control loop. In some examples, as described above, all signal lines carrying high-frequency signals are local and between adjacent elements thereby avoiding the undesired impacts of the package and board-level signal distribution. This enables the array to seamlessly scale both within a single chip and across multiple chip-lets. In the example implementation of FIG. 10, this scheme operates with a multi-chip array and as a result, each module is a separate chip. However, in other examples, each chip can in general be composed of many elements with their own calibration mechanism.

Figure 11A:
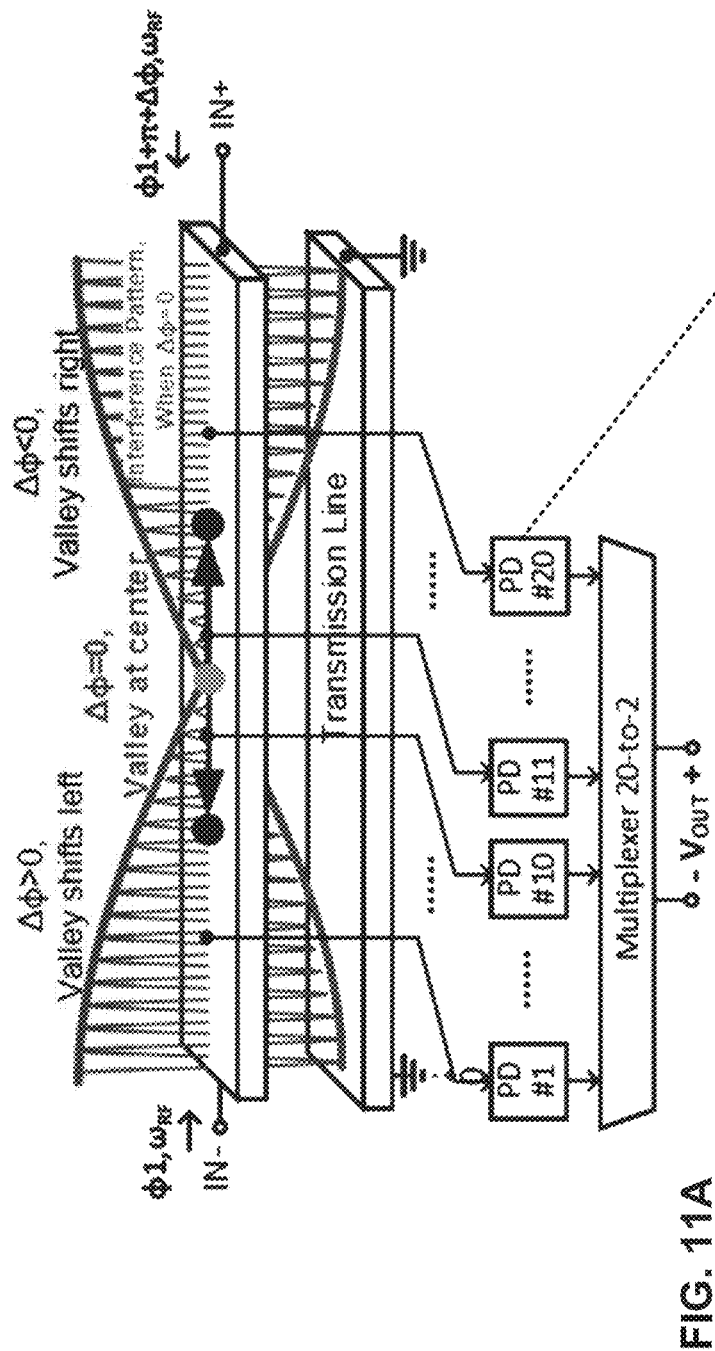
FIG. 11A is a conceptual diagram that illustrates the operation of the interferometry-based phase detector, connected to a schematic of a peak detector.
Figure 11C:
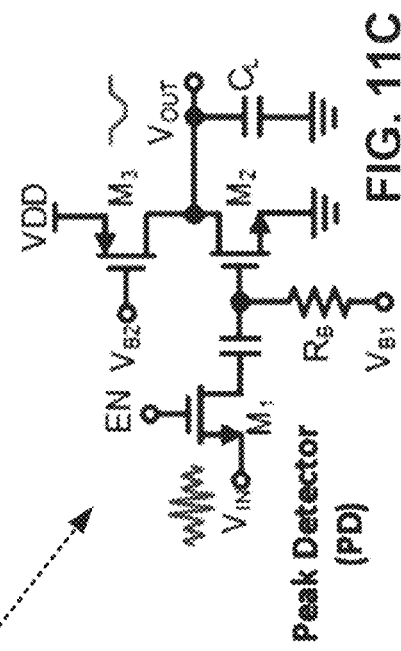
FIG. 11C is a schematic diagram illustrating one possible example implementation of the peak detector.
Figure 11B:
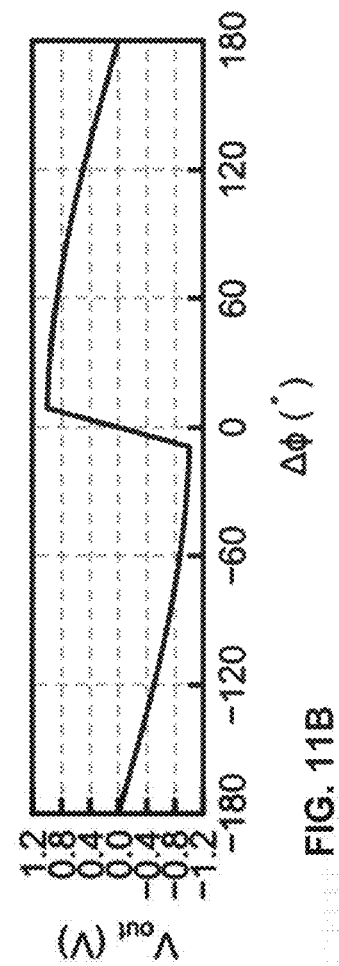
FIG. 11B is a graph illustrating the phase detector characteristic in the central phase setting.

FIGS. 11A, 11B and 11C are examples of FIGS. 3B and 6B described above. FIG. 11A is a conceptual diagram that illustrates the operation principle of the interferometry-based phase detector, connected to a schematic of a peak detector. FIG. 11B is a graph illustrating the phase detector characteristic in the central phase setting. In the example of FIG. 11B, both the 10th and 11th peak detectors are enabled. In this manner the direct phase-to-position mapping of the interferometer enables a reliable phase alignment scheme. FIG. 11C is a schematic diagram illustrating one possible example implementation of the peak detector, e.g., PD #20.

In the examples of FIGS. 11A and 11C, the phase detector loop operates as follows: after the interference pattern is formed, the desired phase difference $\Delta\phi$, between adjacent transmitters maps to a particular location for the valley of the interference pattern, as described above in relation to FIG. 3B. A selected pair of amplitude detectors monitor the pattern at this desired location on the transmission line. Subsequently, the loop compares the current pattern with the desired pattern, producing an analog signal, Vout, representing this difference. The error signal is fed into a control loop to adjust the phase of the second transmitter with respect to the first one. This process occurs concurrently across all the nodes in the array, where the ith and (i+1)th transmitters are compared and the phase of the (i+1)th transmitter is adjusted by the ith loop. The process of phase detection and adjustment run in the background and only requires local connections between $\lambda/2$ separated elements. The design of the wirebond-based transmission line impedance and proper matching as well as the symmetry of the interferometer with respect to the two transmitters minimizes undesired phase errors for a reliable mm-wave phase detection loop.

Figure 12A:
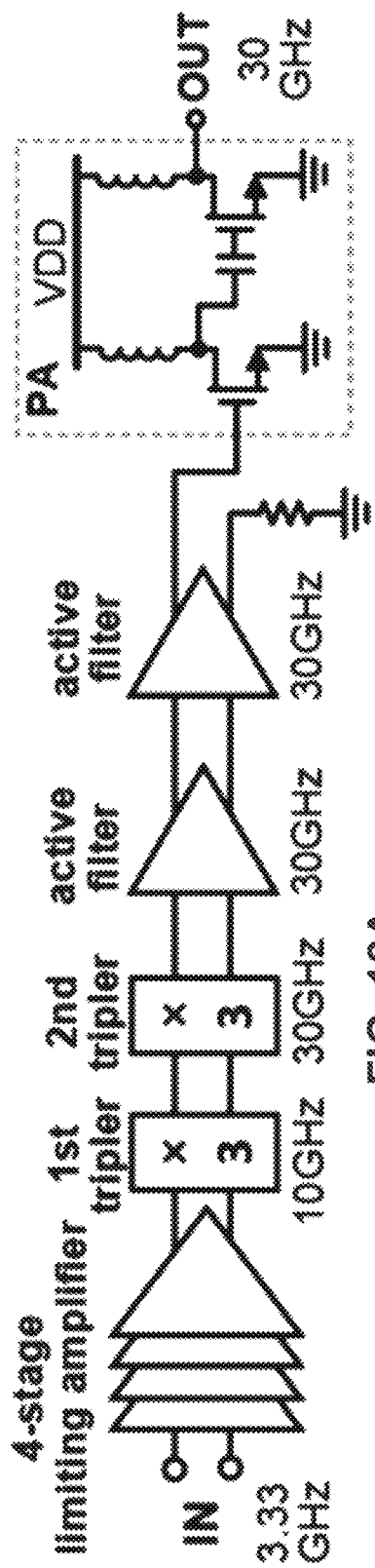
Figure 12A:
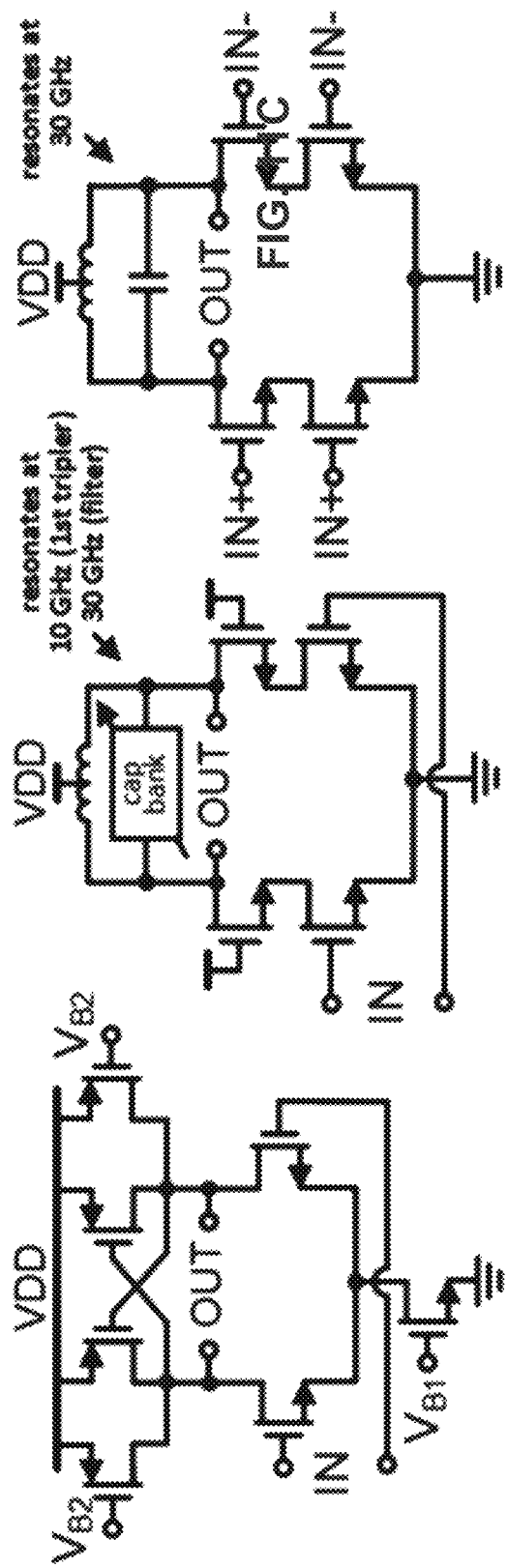

FIGS. 12A-12D are schematic diagrams illustrating the ×9 frequency multiplier chain and building blocks. FIG. 12B illustrates an example one-stage limiting amplifier, FIG. 12C illustrates an example first-stage tripler, FIG. 12D illustrates an example second stage tripler. FIG. 12B illustrates the arrangement of the building blocks including a two-stage 30 GHz filter, and a 30 GHz power amplifier (PA). Buffers are not included in these diagrams.

As described above in relation to FIG. 10, the phase synchronization as well as multi-chip beam forming, in the array architecture of this disclosure by placing one transmitter per chip and implementing mm-wave chip-to-chip interconnection between adjacent modules. The multiplier chain at the transmitter chip is driven by an external RF source that is fed to all the array elements through the board. In this array scheme, reference signal routing connects to all elements through a board-to-chip interconnection. The reference signal does not need to satisfy phase matching.

As shown in FIG. 12A, the 3.3 GHz input tone is first enhanced to a harmonic-rich square wave through a series of limiting amplifiers. The example of FIG. 12A depicts a four stage amplifier, but in other examples, more or few stages may be desirable. An example circuit implementation of one stage of the limiting amplifiers is shown in FIG. 12B.

The output signal from the multiple stage limiting amplifiers signal feeds two cascaded frequency triplers with center frequencies at 10 GHz and 30 GHz. FIG. 12C depicts an example circuit implementation of the first stage tripler, along with active filters, and FIG. 12D depicts an example circuit implementation of the second stage tripler. The cascaded triplers are followed by pseudo-differential cascode resonant amplifiers configured to maximize a third harmonic while filtering other harmonics and other frequencies. The output of the chain of multipliers and filters connects to a two-stage power amplifier driving the off-chip antenna as well as a phase detector buffer.

The interferometer, described above in relation to FIGS. 3B, 6B and 11A-11C may be configured to measure the phase difference between the primary and secondary transmitters, by selecting a pair from the transistor-based peak detectors evenly distributed throughout its transmission line. For example, 20 peak detectors corresponds to 19 distinct phase settings. The outputs of the selected pair of detectors drive a Gm-C cell that amplifies and filters the difference between the two detector outputs. The resulting analog output controls a varactor-based phase shifter that operates in the baseband and adjusts the phase of the reference signal feeding the secondary transmitter chip. The loop filter is configured to ensure stability while providing sufficient phase tuning to cover the desired phase range. The polarity of the inputs to the loop are such that at steady-state, the valley of the interference pattern, shown in FIG. 11A, settles in between the two selected power detectors, e.g., PD 10 and PD 11 of FIG. 11A.

Figure 12E:
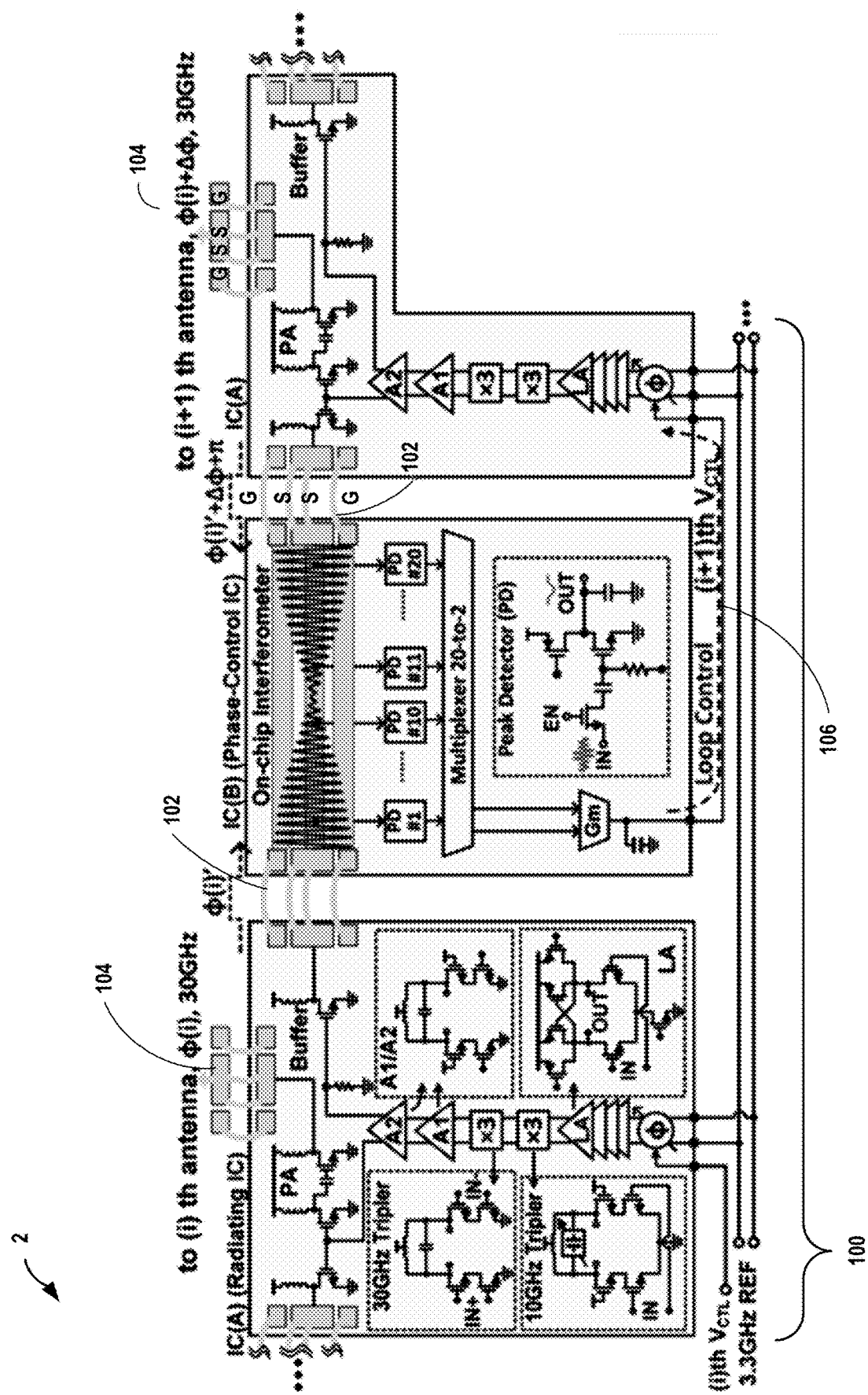
FIG. 12E is a conceptual and schematic diagram of the multi-chip arrangement for the phased array of this disclosure.

FIG. 12E is a conceptual and schematic diagram of the multi-chip arrangement for the phased array of this disclosure. FIG. 12E illustrates an expanded view of FIGS. 12A-12D, and includes interconnects between the ICs as well as the interconnects to the antennae elements. As described above, ICA generates and radiates mm-wave signals, and ICB detects and controls the phase difference of adjacent ICA's to achieve phase self-aligning between chips. In other examples, ICA and ICB may be implemented on a single integrated circuit.

The multi-chip scheme depicted in FIG. 12E, employs two types of interconnects. The first interconnect 100 comprises regular wirebonds for the analog control signal from module B to module A as well as RF and supply connections. The second interconnect includes Ka-band chip-to-chip wirebonds 102 between the buffer in the two module A chips and the interferometer in the module B chip as well as for the PA to antenna feed 104.

The Ka-band wirebonds, 102 and 104, use a double GSSG line to achieve a practical line impedance at RF frequencies while satisfying bonding diameter and spacing design constraints. Two parallel signal lines reduce the impedance to a practical Zo=80Ω, which is matched to the buffer on the transmitter chip and the interferometer on the control chip, in the example of FIG. 12E. As described above, in other examples, different frequencies and impedances may be desirable.

The example of FIG. 12E shows the proposed 3-chip phase alignment scheme. As described above in relation to FIGS. 12A-12D, in the architecture of FIG. 12E, the left and right ICA chips independently produce a mm-wave local oscillator (LO) signal and radiate through an off-chip antenna via connections 104. The interferometric chip ICB in the middle of the left and right ICA chips measures the phase difference between the two LO signals and adjusts the LO signals to achieve the desired phase difference.

The mm-wave LO is produced through a chain of multipliers from an external RF signal. As described above, board-level routing of the external RF signal, also referred to as the baseband signal, to each of the transmitters does not need to ensure phase matching. Instead, the interferometer as described above forms an interference pattern by combining a version of the LO signals from the two adjacent chips. A series of power detectors e.g., as shown in FIG. 11A may detect the local of the valley of the pattern.

Depending on the desired phase difference Δϕ, the circuitry selects the pair of power detectors in the vicinity of this desired valley point. A Gm-C filter compares and amplifies the difference between the amplitude at these two points and produces a control signal. The control signal, loop control 106, forms a loop that controls the phase of the first ICA transmitter with respect to the second ICA transmitter. In this manner, the circuitry performs phase detection at the mm-wave signal while phase adjustment is performed in the low-frequency RF signal through a varactor-loaded inverter chain. This ensures phase detection is direct and accurate while the phase adjustment module is low power and provides sufficient tuning range. The settling time of the loop is a function of the number of elements and the filter design ensures loop response is unconditionally stable, even as the array scale increases.

Figure 13A:
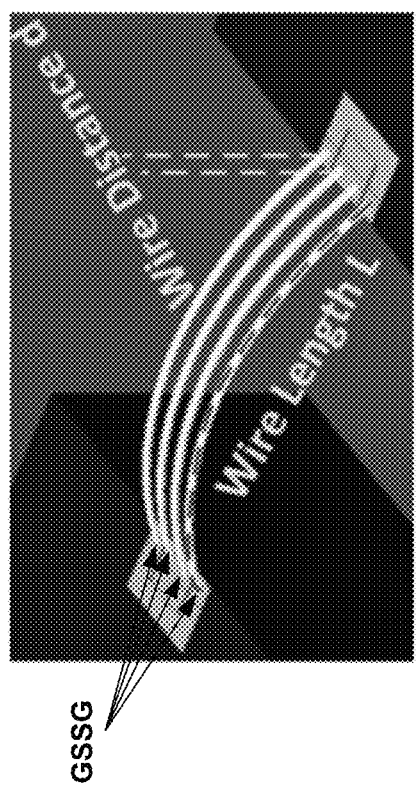
FIG. 13A is a conceptual diagram illustrating the dimensions and arrangement of the GSSG chip-to-chip transmission line.

FIG. 13A is a conceptual diagram illustrating the dimensions and arrangement of the GSSG chip-to-chip transmission line. For a symmetric connection on both sides and impedance matching across the transmission line, the phase shifter produced by these two lines cancels each other out. FIG. 13A also depicts the wire length, L, of each bond and the wire distance, d, between each bond.

Figure 13B:
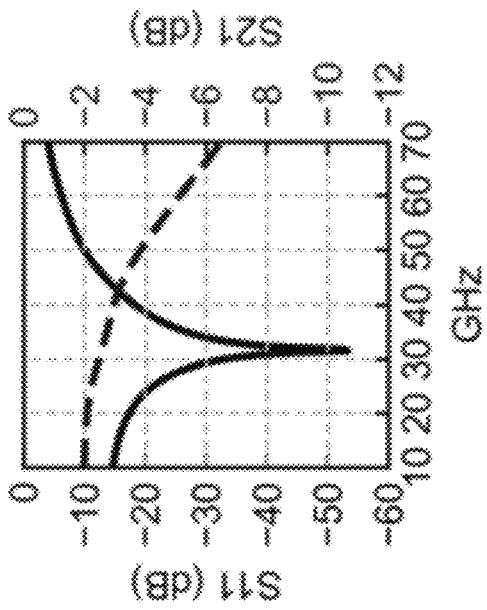
FIGS. 13B, 13C and 13D are graphs illustrating simulations showing the dependency of the phase shift and reflection coefficient of the wirebond structure.
Figure 13C:
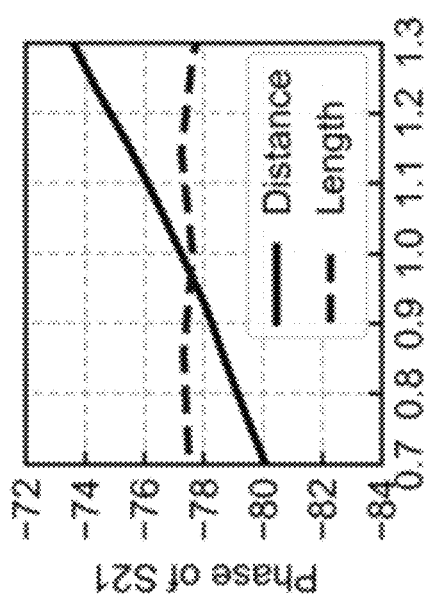
Figure 13D:
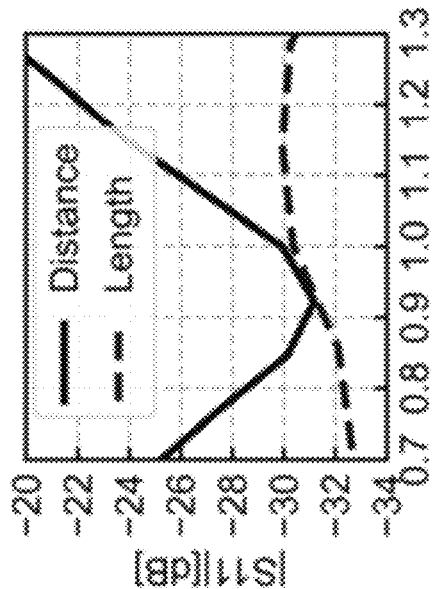

FIGS. 13B, 13C and 13D are graphs illustrating simulations showing the dependency of the phase shift (FIG. 13C) and reflection coefficient (FIG. 13D) of the wirebond structure as a function of changes in the length L (curvature) and distance, d, between adjacent wires with Zo=80Ω and the simulated S-parameters (normalized to 80Ω). FIGS. 13B-13D quantify the behavior and sensitivity of the GSSG transmission line of this disclosure. The main sources of variation in the characteristics of the line are the physical separation between signal and ground as well as the curvature of the line. The simulations perform a sweep in both these variables showing that the phase of the transmission line is robust to ±10% variations in the curvature and separation.

Figure 14:
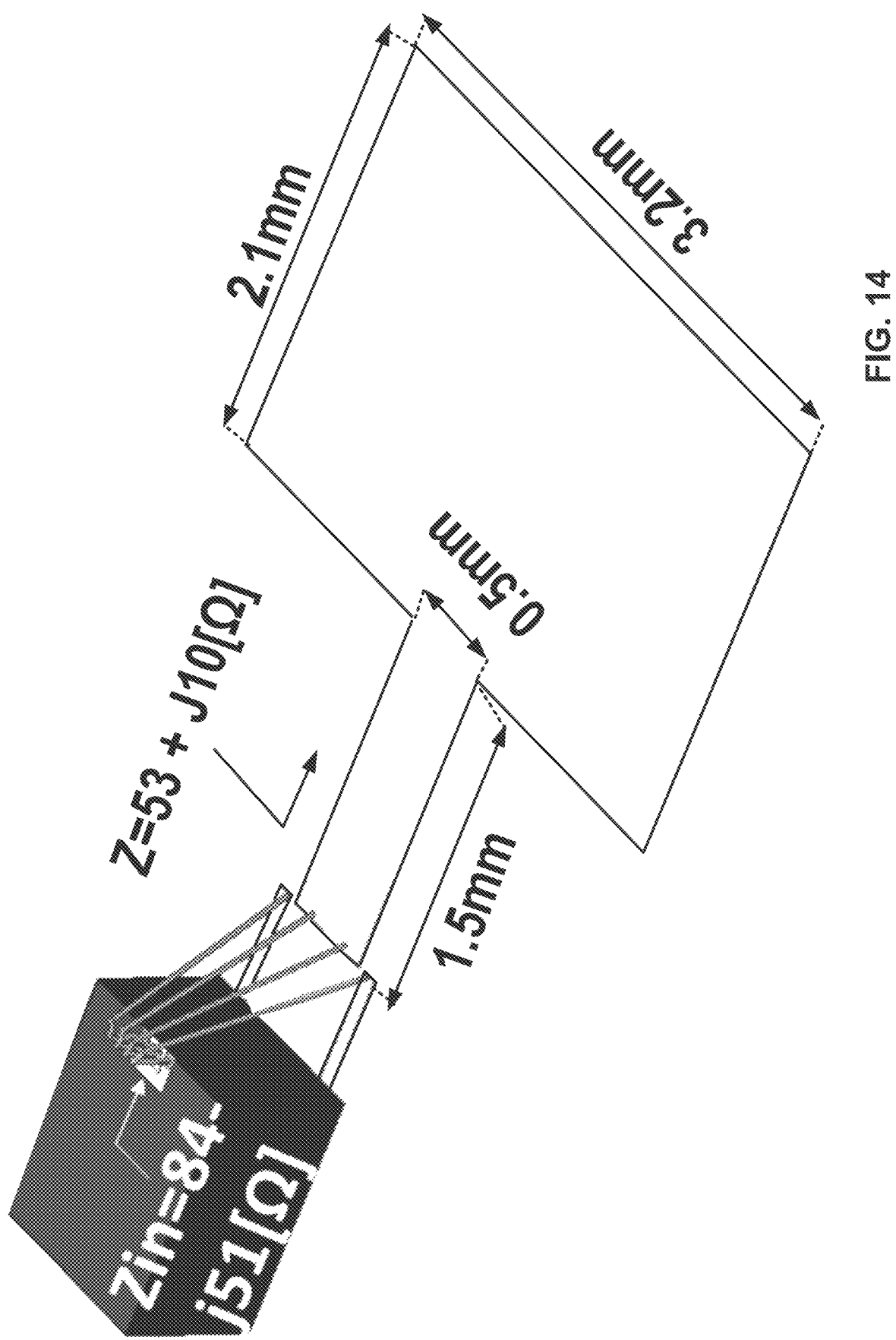
FIG. 14 is a conceptual diagram illustrating the antenna impedance seen by the power amplifier on both sides of the wire bonds.

FIG. 14 is a conceptual diagram illustrating the antenna impedance seen by the PA on both sides of the wire bonds at 30 GHz. In the example of FIG. 14, The antenna has a center frequency at 30 GHz and the antenna is fed through a short chip-to-board wirebond.

Figure 15A:
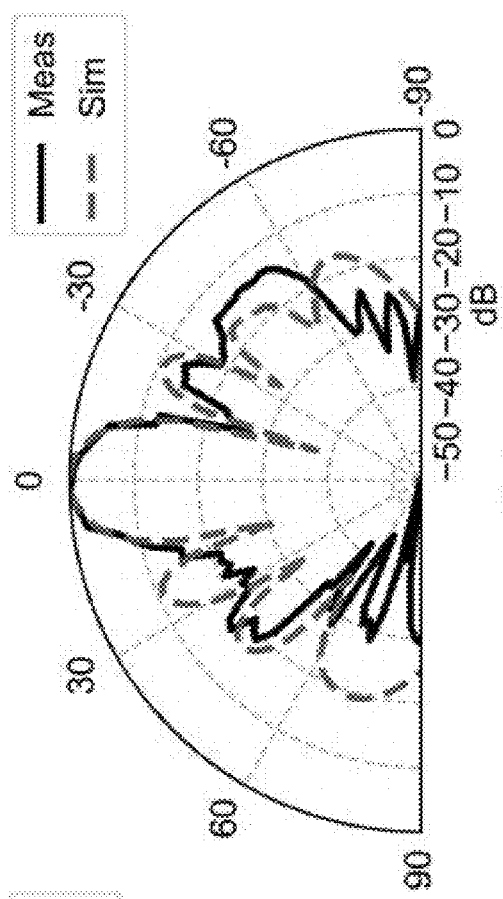
FIGS. 15A and 15B are radiation pattern graphs that compare the over-the-air measured radiation pattern of 1×5 and 1×7 array configurations when the interferometer is set to the central phase setting.
Figure 15B:
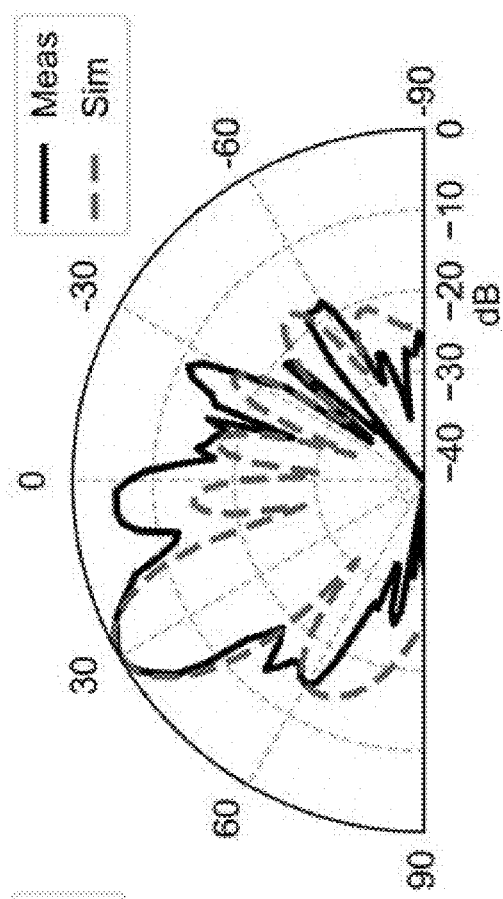

FIGS. 15A and 15B are radiation pattern graphs that compare the over-the-air measured radiation pattern of 1×5 and 1×7 array configurations when the interferometer is set to the central phase setting. FIG. 15A shows the measured and simulated results for the 1×5 array, while FIG. 15B shows the measured and simulated results for a 1×7 array. The comparison between full-wave simulation of the antenna and measured results indicates that the resulting beam closely follows the expected result from phase coherent combining of the individual antennae.

Figure 15C:
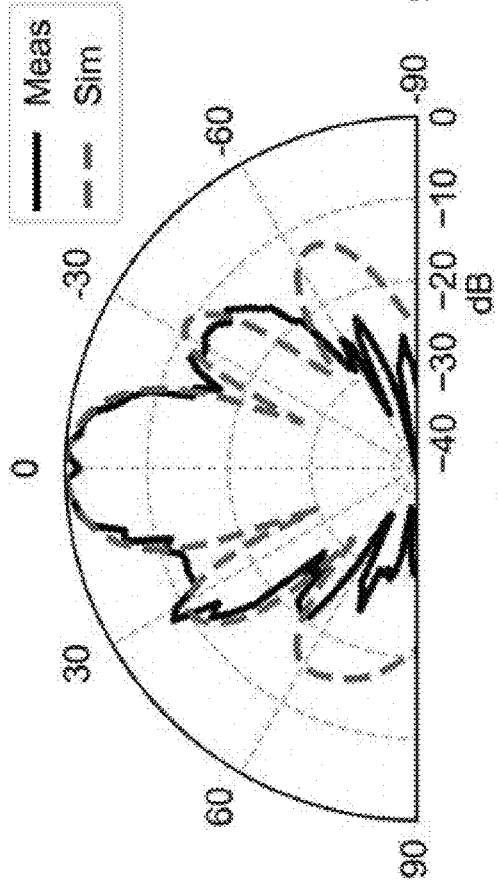
FIGS. 15C and 15D are pattern graphs illustrating the radiation pattern of the 1×7 array when the phase setting is set to the maximum positive and negative settings.
Figure 15D:
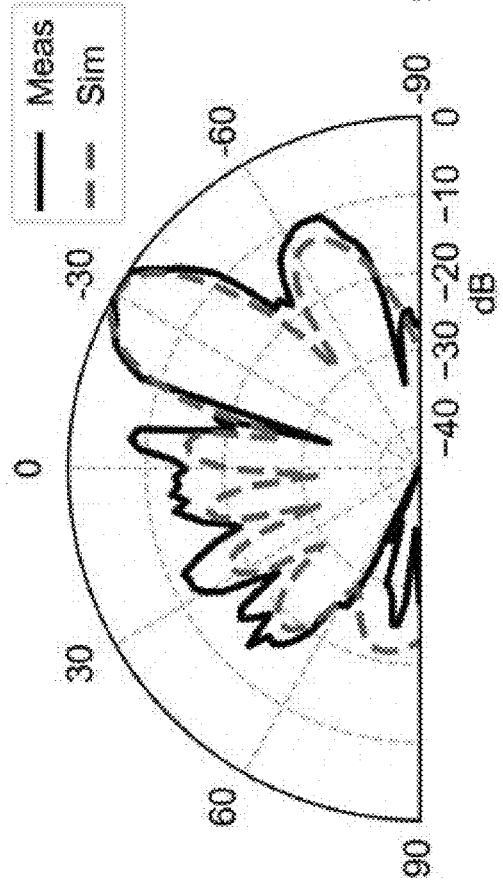

FIGS. 15C and 15D are pattern graphs illustrating the radiation pattern of the 1×7 array when the phase setting is set to the maximum positive and negative settings. FIG. 15C depicts the maximum available negative setting and FIG. 15D depicts the maximum available positive setting. These two extreme settings may correspond to the beam steered toward extreme positive and negative angles. Both the measured beam width and angle of the main lobe closely follow the expected results from the simulations. FIGS. 15B, 15C and 15D show three beams corresponding respectively to the middle, minimum, and maximum phase settings, i.e. selecting the first (10, 11), central (1, 2), and last (19, 20) pair of detectors at module B chips, as shown in FIG. 11A.

The scalable multi-chip implementation of the phased array radiator of this disclosure may provide several advantages, including, for example, the nearest neighbor interferometric self-alignment technique. The measured results from the prototype validate the energy-efficient background phase monitoring scheme, demonstrating beam steering across a multi-chip array aperture, The architecture of this disclosure may enable large-scale mm-wave arrays without the need for global LO distribution and element-to-element calibration.

The techniques of this disclosure may also be described in the following examples.

Example 1: A circuit configured to transmit wireless electromagnetic radiation comprising a first transmission element and a second transmission element, wherein the first transmission element is configured to receive a first radio-frequency (RF) signal, the second transmission element is configured to receive a second RF signal, and the first RF signal has the same frequency as the second RF signal; phase detector circuitry connected between the first transmission element and the second transmission element, the phase detector circuitry includes a transmission line connecting the first transmission element to the second transmission element; and a plurality of peak detectors arranged along the transmission line, the plurality of peak detectors configured to measure an interference pattern on the transmission line caused by the first RF signal and the second RF signal; a multiplexor configured to: receive outputs from each peak detector of the plurality of peak detectors; and receive a command to select a first peak detector and a second peak detector; and phase shifter circuitry configured to: receive an output from the multiplexor; adjust a phase difference between the first RF signal and the second RF signal based on a difference between the first peak detector and the second peak detector.

Example 2: The circuit of example 1, further comprising receive outputs from the multiplexor comprising the difference between the first peak detector and the second peak detector; integrate the difference between the two selected peak detectors; remove high frequency spurs; and output the filtered and integrated difference between the first peak detector and the second peak detector to the phase shifter circuitry.

Example 3: The circuit of any of examples 1 and 2, further comprising a first frequency multiplier configured to receive a baseband signal and output the first RF signal to the first transmission element; and a second frequency multiplier configured to receive the baseband signal and output the second RF signal to the second transmission element.

Example 4: The circuit of example 3, wherein the transmission line connects an output of a first polarity from the first frequency multiplier to an output of a second polarity from the second frequency multiplier, and wherein the first polarity is an opposite polarity to the second polarity.

Example 5: The circuit of any of examples 3 and 4, wherein the transmission line connects an output of a first polarity from the first frequency multiplier to an output of a second polarity from the second frequency multiplier, and wherein the first polarity is a same polarity to the second polarity.

Example 6: The circuit of any of examples 3 through 5, wherein the phase shifter circuitry is: connected between an input to the first frequency multiplier and an input to the second frequency multiplier; and configured to control a phase difference between the baseband signal received by the first frequency multiplier and the baseband signal received by the second frequency multiplier.

Example 7: The circuit of any of examples 3 through 6, further comprising a third frequency multiplier connected between the transmission line and the first transmission element, the third frequency multiplier configured to: receive the first RF signal from the first frequency multiplier; and output the multiplied first RF signal to the first transmission element; and a fourth frequency multiplier connected between the transmission line and the second transmission element, the fourth frequency multiplier configured to: receive the second RF signal from the second frequency multiplier; and output the multiplied second RF signal to the second transmission element.

Example 8: The circuit of any of examples 3 through 7, further comprising an input terminal, a first output terminal and a second output terminal; connected to the baseband signal at the input terminal; configured to output the baseband signal from the first output terminal with a first polarity; and configured to output the baseband signal from the second output terminal with a second polarity opposite to the first polarity.

Example 9: A method comprising receiving, by a first transmission element, a first radio frequency (RF) signal; receiving, by a second transmission element, a second RF signal; measuring, by phase detector circuitry connected between the first transmission element and the second transmission element, an interference pattern: wherein the phase detector circuitry comprises: a transmission line, and a plurality of peak detectors arranged along the transmission line, and wherein the interference pattern is on the transmission line, and wherein the plurality of peak detectors is configured to measure the interference pattern on the transmission line caused by the first RF signal and the second RF signal; receiving, by a multiplexor, outputs from each peak detector of the plurality of peak detectors; receiving, by the multiplexor, a command to select a first peak detector and a second peak detector; receiving, by phase shifter circuitry, outputs of the first peak detector and the second peak detector provided by the multiplexor; and adjusting, by the phase shifter circuitry, a phase difference between the first RF signal and the second RF signal based on a difference between the first peak detector and the second peak detector.

Example 10: The method of example 9, further comprising multiplying a baseband signal by a first frequency multiplier, wherein an output of the first frequency multiplier comprises the first RF signal to the first transmission element; and multiplying the baseband signal by a second frequency multiplier, wherein an output of the first frequency multiplier comprises the second RF signal to the second transmission element.

Example 11: The method of example 10, wherein the transmission line connects an output of a first polarity from the first frequency multiplier to an output of a second polarity from the second frequency multiplier, and wherein the first polarity is an opposite polarity to the second polarity.

Example 12: The method of any of examples 10 and 11, wherein the transmission line connects an output of a first polarity from the first frequency multiplier to an output of a second polarity from the second frequency multiplier, and wherein the first polarity is a same polarity to the second polarity.

Example 13: The method of any of examples 10 through 12, wherein the phase shifter circuitry is: connected between an input to the first frequency multiplier and an input to the second frequency multiplier; and configured to control a phase difference between the baseband signal received by the first frequency multiplier and the baseband signal received by the second frequency multiplier.

Example 14: The circuit of example 1, wherein the first transmission element connects to a first integrated circuit (IC), the first IC configured to generate the first RF signal, wherein the second transmission element connects to a second IC, the second IC configured to generate the second RF signal, and wherein the phase detector circuitry is implemented on a third IC.

Example 15: The circuit of example 14, wherein the phase detector circuitry connects to the first IC with wirebonds comprising a GSSG transmission line, and wherein the phase detector circuitry connects to the second IC with wirebonds comprising a GSSG transmission line.

Example 16: The circuit of examples 14 and 15, wherein the first IC and the second IC are configured to receive a baseband RF signal.

Example 17: The circuit of any of examples 14-16, wherein the first IC, the second IC and the third IC comprise a circuit arrangement configured to implement a nearest neighbor interferometric self-alignment technique.

Example 18: The circuit of any of examples 14-17, wherein the phase detector circuitry is configured to perform phase detection at a mm-wave signal from the transmission elements and configured to perform phase adjustment in the baseband RF signal.

In one or more examples, the functions described above may be implemented in hardware, software, firmware, or any combination thereof. For example, the various components of FIGS. 1 and 2C, such as processing circuitry 54, may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein, such as processing circuitry 54, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A circuit configured to receive wireless electromagnetic radiation, the circuit comprising:
a first radiating element and a second radiating element, wherein
the first radiating element is configured to receive a first radio-frequency (RF) signal,
the second radiating element is configured to receive a second RF signal, and
the first RF signal has the same frequency as the second RF signal;
phase detector circuitry connected between the first radiating element and the second radiating element, the phase detector circuitry comprising:
a transmission line connecting the first radiating element to the second radiating element; and
a plurality of peak detectors arranged along the transmission line, the plurality of peak detectors configured to measure an interference pattern on the transmission line caused by the first RF signal and the second RF signal;
a multiplexor configured to:
receive outputs from each peak detector of the plurality of peak detectors; and
receive a command to select a first peak detector and a second peak detector; and
phase shifter circuitry configured to:
receive an output from the multiplexor;
adjust a phase difference between the first RF signal and the second RF signal based on a difference in the outputs between the first peak detector and the second peak detector.

2. The circuit of claim 1, further comprising filter circuitry configured to:
receive outputs from the multiplexor comprising the difference in the outputs between the first peak detector and the second peak detector;
integrate the difference between the first peak detector and the second peak detector;
remove high frequency spurs; and
output the filtered and integrated difference between the first peak detector and the second peak detector to the phase shifter circuitry.

3. The circuit of claim 1, further comprising:
a first frequency multiplier configured to receive a baseband signal and output the first RF signal to the first radiating element; and
a second frequency multiplier configured to receive the baseband signal and output the second RF signal to the second radiating element.

4. The circuit of claim 3,
wherein the transmission line connects an output of a first polarity from the first frequency multiplier to an output of a second polarity from the second frequency multiplier, and
wherein the first polarity is an opposite polarity to the second polarity.

5. The circuit of claim 3,
wherein the transmission line connects an output of a first polarity from the first frequency multiplier to an output of a second polarity from the second frequency multiplier, and
wherein the first polarity is a same polarity to the second polarity.

6. The circuit of claim 3, wherein the phase shifter circuitry is:
connected between an input to the first frequency multiplier and an input to the second frequency multiplier; and configured to control a phase difference between the baseband signal received by the first frequency multiplier and the baseband signal received by the second frequency multiplier.

7. The circuit of claim 3, further comprising:
a third frequency multiplier connected between the transmission line and the first radiating element, the third frequency multiplier configured to:
receive the first RF signal from the first frequency multiplier; and
output a multiplied first RF signal to the first radiating element; and
a fourth frequency multiplier connected between the transmission line and the second radiating element, the fourth frequency multiplier configured to:
receive the second RF signal from the second frequency multiplier; and
output a multiplied second RF signal to the second radiating element.

8. The circuit of claim 3, further comprising a signal splitter:
comprising an input terminal, a first output terminal and a second output terminal;
connected to the baseband signal at the input terminal;
configured to output the baseband signal from the first output terminal with a first polarity; and
configured to output the baseband signal from the second output terminal with a second polarity opposite to the first polarity.

9. A method comprising:
receiving, by a first radiating element, a first radio frequency (RF) signal;
receiving, by a second radiating element, a second RF signal;
measuring, by phase detector circuitry connected between the first radiating element and the second radiating element, an interference pattern:
wherein the phase detector circuitry comprises:
a transmission line, and
a plurality of peak detectors arranged along the transmission line, and
wherein the interference pattern is on the transmission line, and
wherein the plurality of peak detectors is configured to measure the interference pattern on the transmission line caused by the first RF signal and the second RF signal;
receiving, by a multiplexor, outputs from each peak detector of the plurality of peak detectors;
receiving, by the multiplexor, a command to select a first peak detector and a second peak detector;
receiving, by phase shifter circuitry, outputs of the first peak detector and the second peak detector provided by the multiplexor; and
adjusting, by the phase shifter circuitry, a phase difference between the first RF signal and the second RF signal based on a difference between the first peak detector and the second peak detector.

10. The method of claim 9, further comprising:
multiplying a baseband signal by a first frequency multiplier, wherein an output of the first frequency multiplier comprises the first RF signal to the first radiating element; and
multiplying the baseband signal by a second frequency multiplier, wherein an output of the first frequency multiplier comprises the second RF signal to the second radiating element.

11. The method of claim 10,
wherein the transmission line connects an output of a first polarity from the first frequency multiplier to an output of a second polarity from the second frequency multiplier, and
wherein the first polarity is an opposite polarity to the second polarity.

12. The method of claim 10,
wherein the transmission line connects an output of a first polarity from the first frequency multiplier to an output of a second polarity from the second frequency multiplier, and
wherein the first polarity is a same polarity to the second polarity.

13. The method of claim 10, wherein the phase shifter circuitry is:
connected between an input to the first frequency multiplier and an input to the second frequency multiplier; and
configured to control a phase difference between the baseband signal received by the first frequency multiplier and the baseband signal received by the second frequency multiplier.

* * * * *